United States Patent
Larsen et al.

(10) Patent No.: US 8,874,311 B2
(45) Date of Patent: Oct. 28, 2014

(54) CONTROL PANEL SYSTEM FOR A VEHICLE

(75) Inventors: Ty Aaby Larsen, Everett, WA (US); Emma Romig, Seattle, WA (US)

(73) Assignee: The Boeing Company, Chicago, IL (US)

(*) Notice: Subject to any disclaimer, the term of this patent is extended or adjusted under 35 U.S.C. 154(b) by 59 days.

(21) Appl. No.: 13/297,641

(22) Filed: Nov. 16, 2011

(65) Prior Publication Data

US 2013/0124017 A1  May 16, 2013

(51) Int. Cl.
*G06F 7/00* (2006.01)
*G06F 9/445* (2006.01)
*G06F 11/20* (2006.01)
*G06F 9/44* (2006.01)

(52) U.S. Cl.
CPC .............. *G06F 11/2017* (2013.01); *G06F 8/60* (2013.01); *G06F 9/44505* (2013.01); *G06F 9/4443* (2013.01)
USPC .......... 701/36; 701/29.4; 701/29.6; 701/32.7; 701/32.8; 340/961; 340/970; 340/981; 340/982

(58) Field of Classification Search
USPC ................................ 701/36, 29.6, 32.7, 32.8
See application file for complete search history.

(56) References Cited

U.S. PATENT DOCUMENTS

| | | | |
|---|---|---|---|
| 6,519,511 B1* | 2/2003 | Oberschachtsiek et al. ...... | 701/1 |
| 7,069,261 B2* | 6/2006 | Ahl et al. .............................. | 1/1 |
| 7,382,285 B2* | 6/2008 | Horvath et al. ............... | 340/961 |
| 8,484,510 B2* | 7/2013 | Shankar et al. ................. | 714/13 |
| 2002/0154605 A1 | 10/2002 | Preston et al. | |
| 2003/0174360 A1* | 9/2003 | Ohshima ..................... | 358/1.15 |
| 2005/0093718 A1* | 5/2005 | Martin ........................... | 340/981 |
| 2006/0009890 A1* | 1/2006 | Meister et al. .................. | 701/36 |
| 2006/0164261 A1* | 7/2006 | Stiffler ......................... | 340/945 |
| 2008/0133687 A1* | 6/2008 | Fok et al. ..................... | 709/207 |
| 2010/0271194 A1 | 10/2010 | Masui et al. | |
| 2011/0145631 A1 | 6/2011 | Shankar et al. | |

FOREIGN PATENT DOCUMENTS

| | | |
|---|---|---|
| DE | 10061190 A1 | 6/2002 |
| EP | 1125784 A2 | 8/2001 |
| EP | 1266786 A2 | 12/2002 |

OTHER PUBLICATIONS

PCT search report dated Mar. 21, 2003 regarding application PCT/US2012055589, filing date Sep. 14, 2012, applicant The Boeing Company, 13 pages.
International Preliminary Report on Patentability and Written Opinion, dated May 20, 2014, regarding Application No. PCT/US2012/055589, 8 pages.

* cited by examiner

*Primary Examiner* — Redhwan k Mawari
(74) *Attorney, Agent, or Firm* — Yee & Associates, P.C.

(57) ABSTRACT

A method and apparatus for managing a programmable control panel for a vehicle. A number of first level control functions is assigned to the programmable control panel for the vehicle. A number of second level control functions is assigned to the programmable control panel based on a health of programmable control panels in the vehicle.

16 Claims, 17 Drawing Sheets

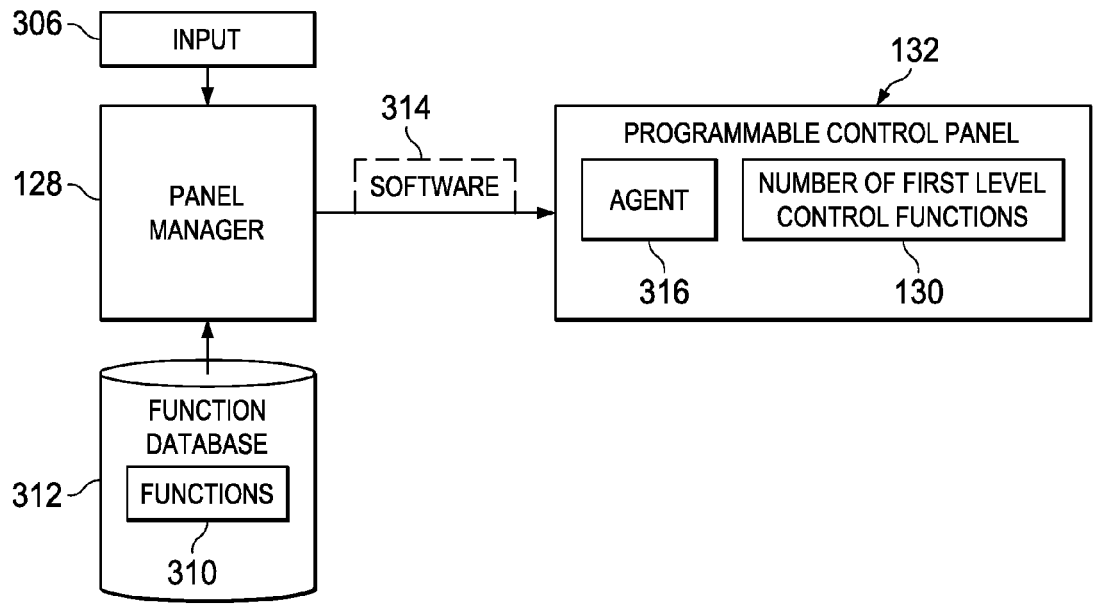
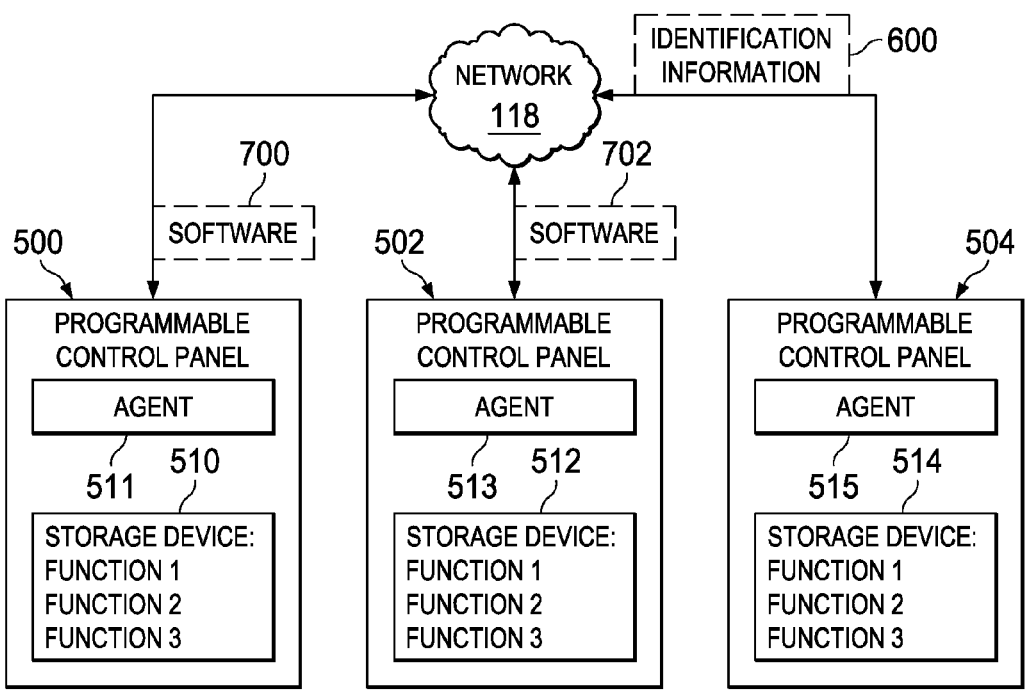

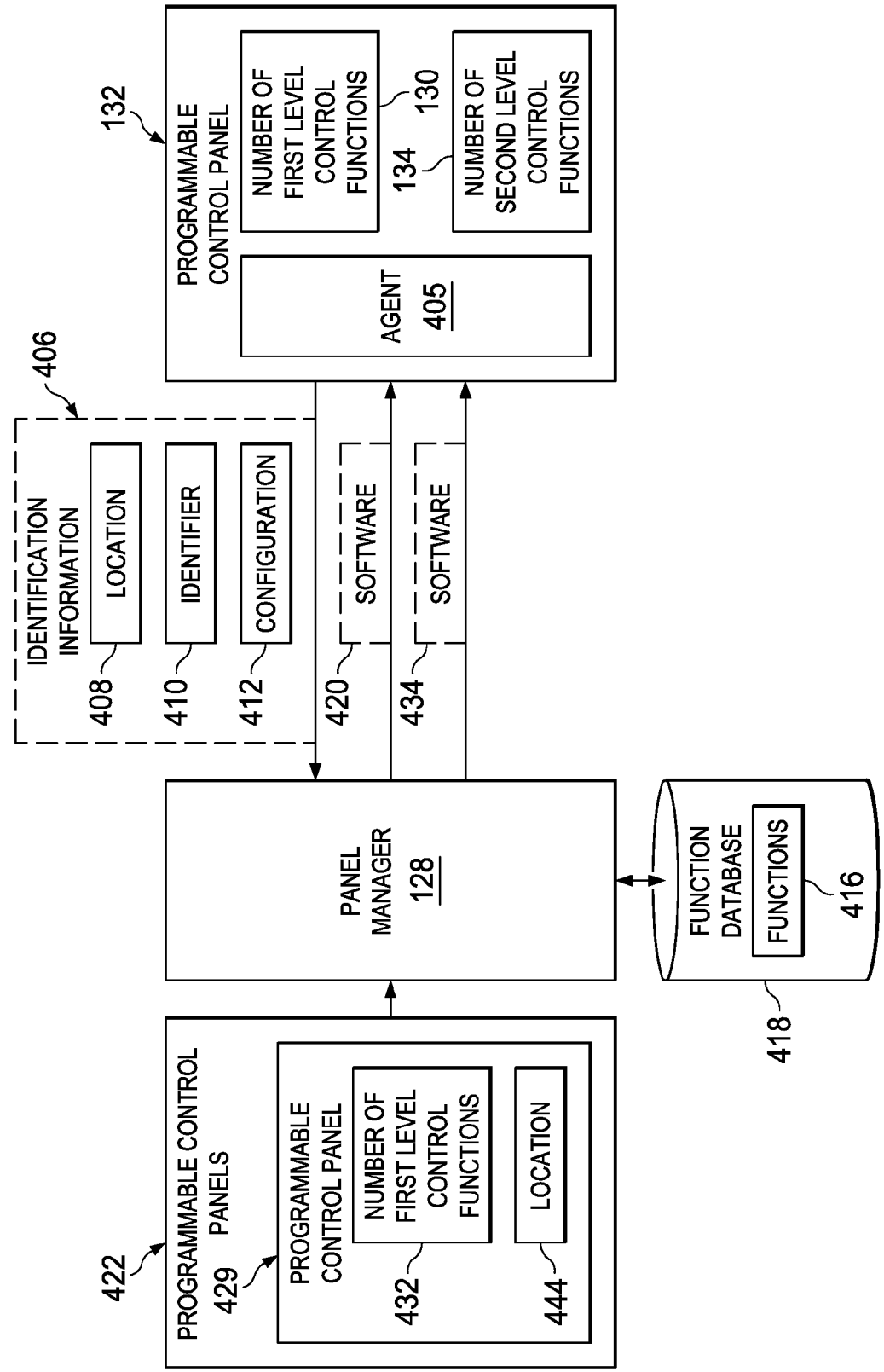

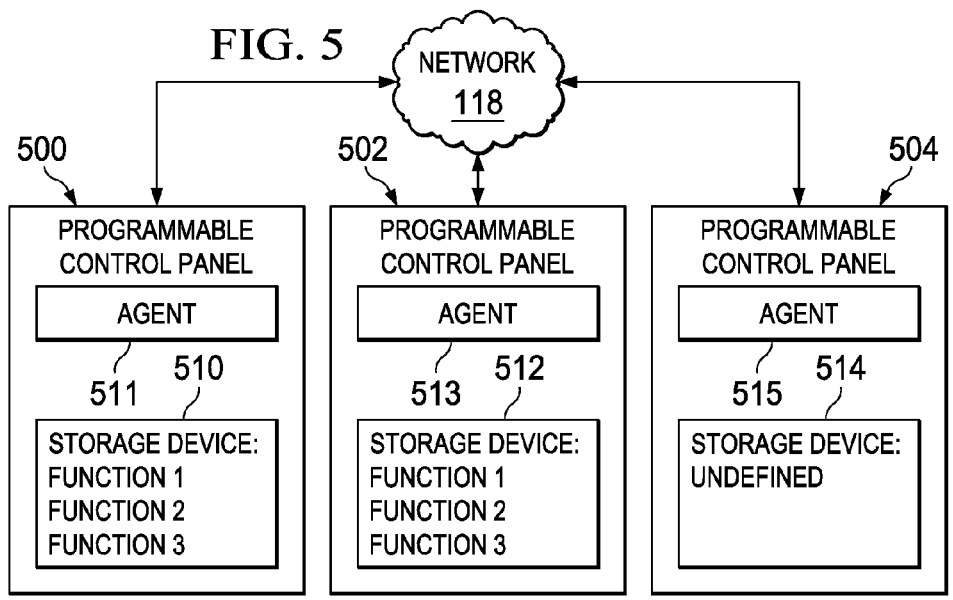
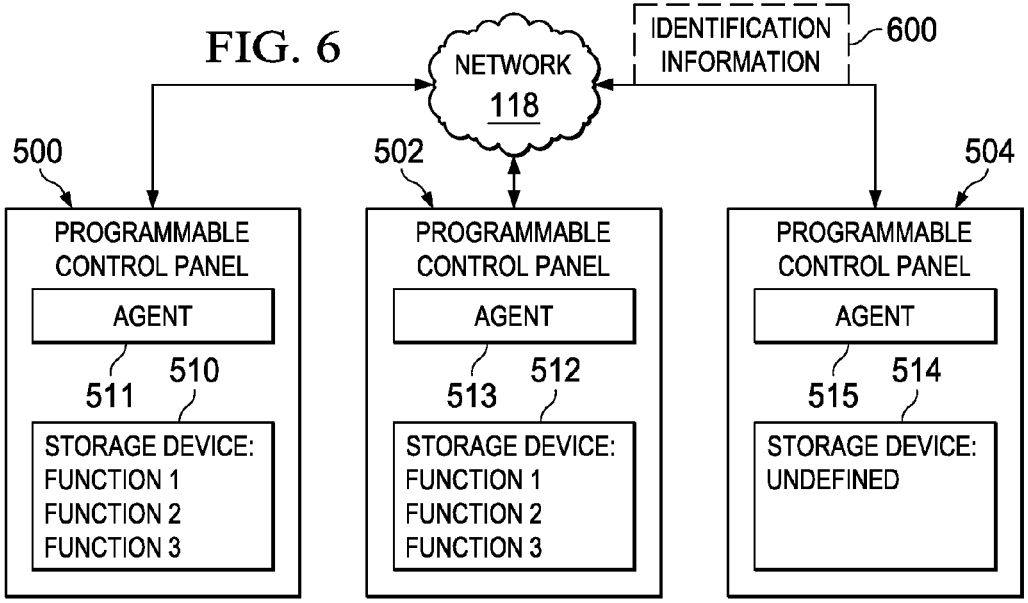

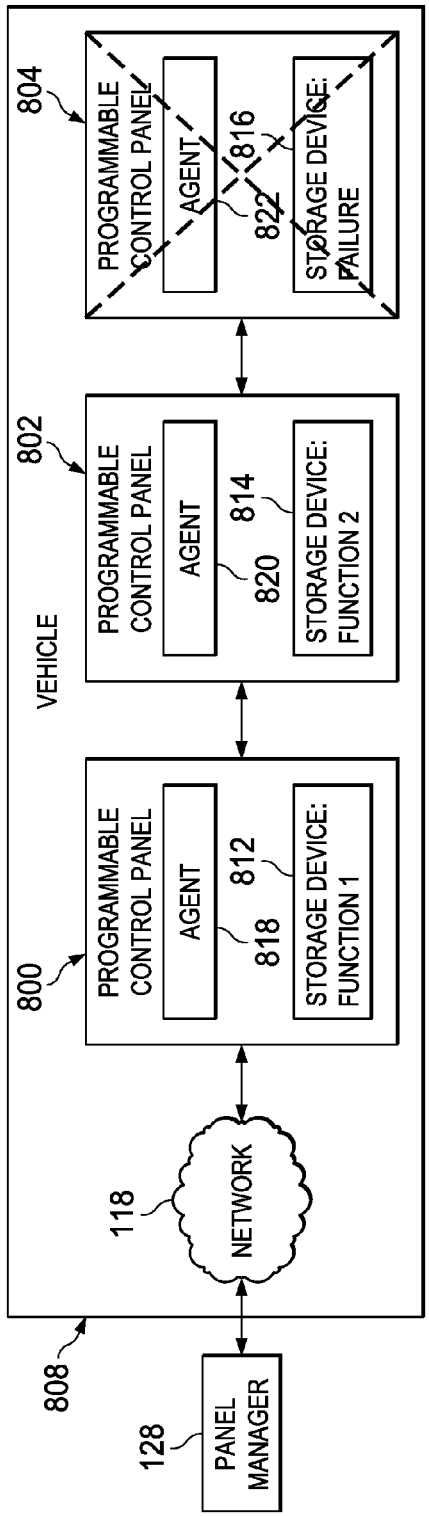
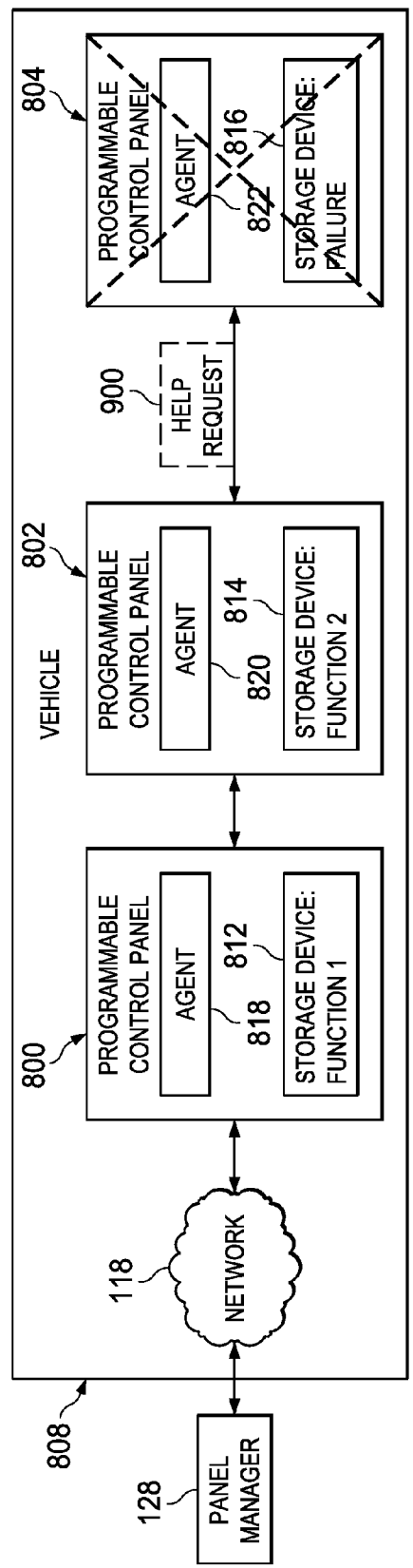

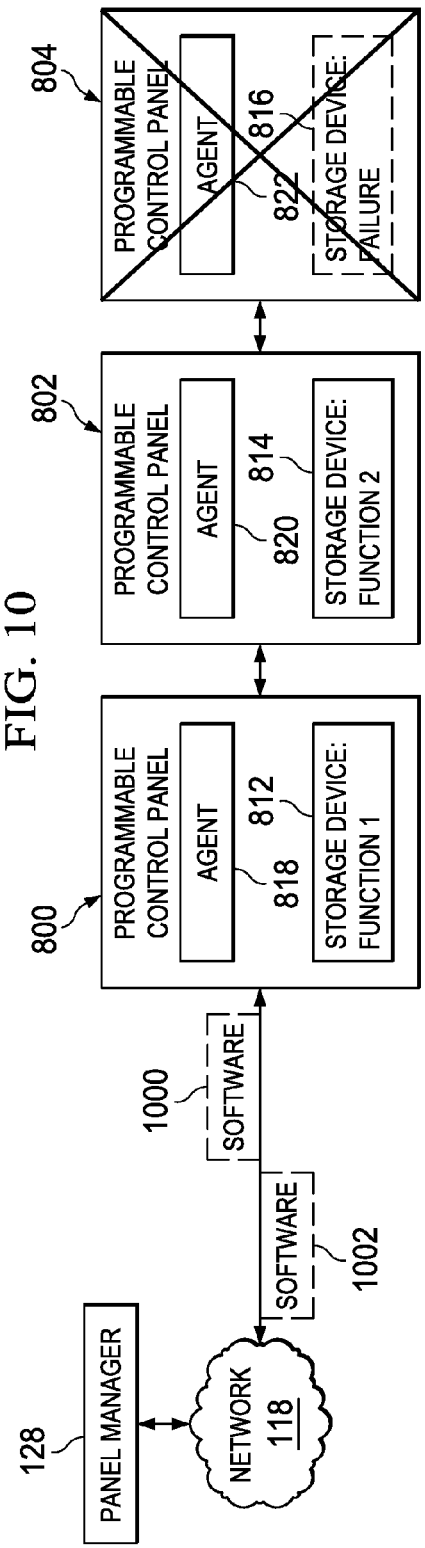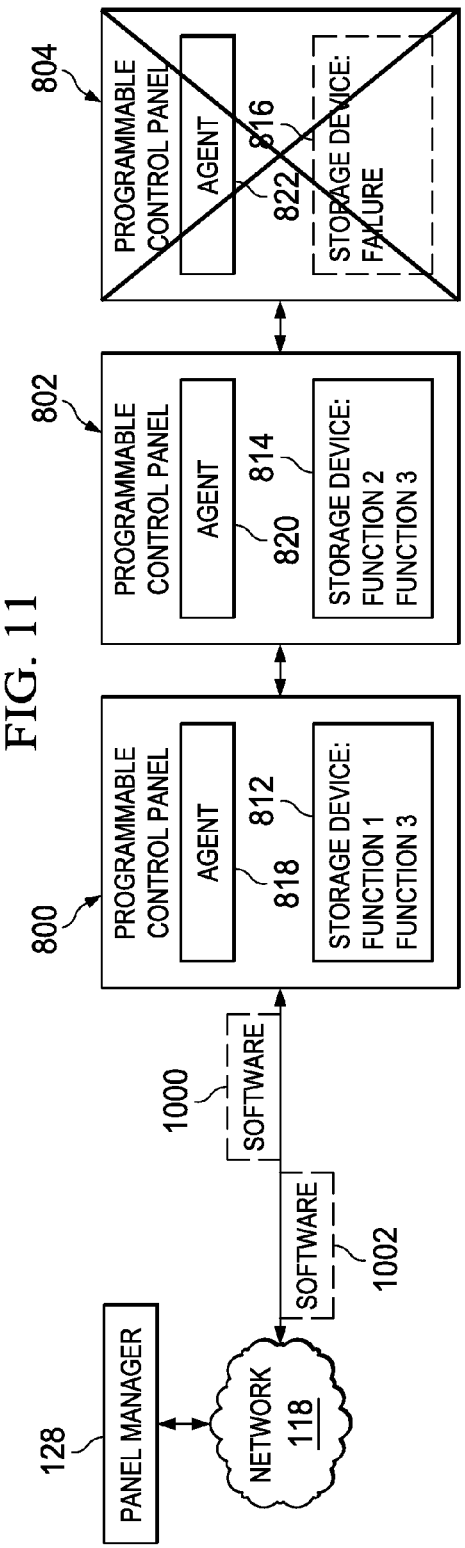

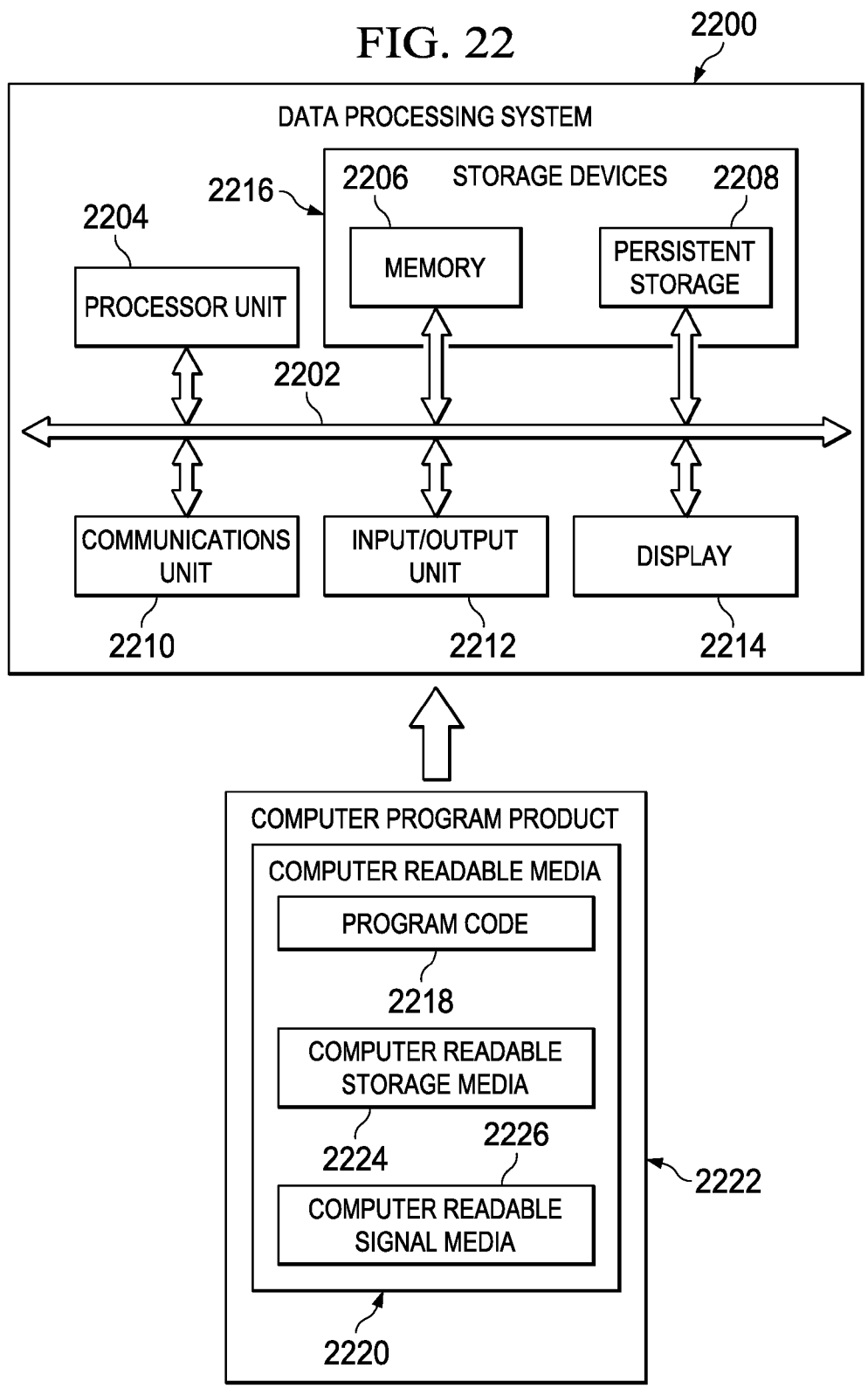

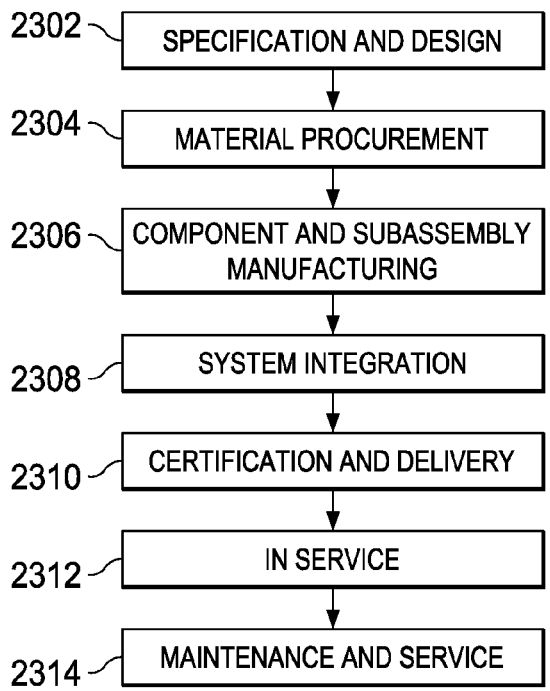
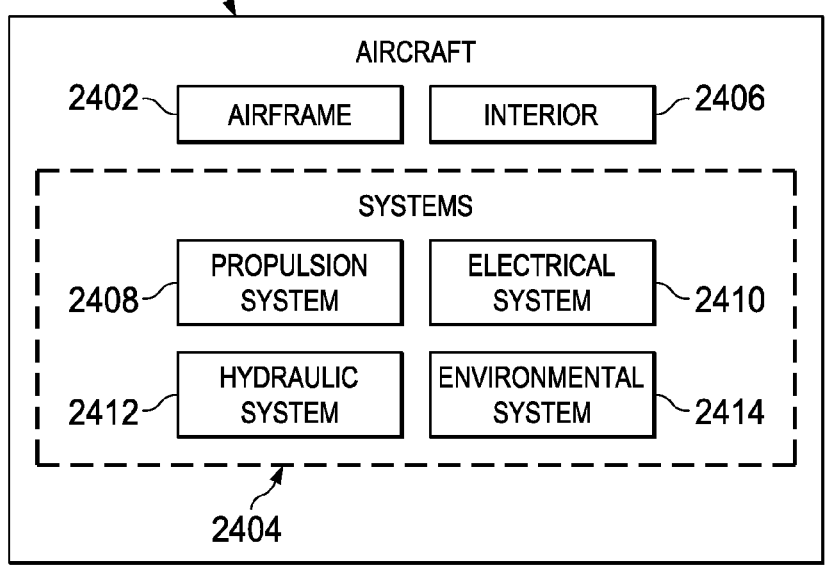

CONTROL PANEL SYSTEM FOR A VEHICLE

BACKGROUND INFORMATION

1. Field

The present disclosure relates generally to vehicles and, in particular, to aircraft. Still more particularly, the present disclosure relates to control panel systems in aircraft.

2. Background

In operating an aircraft, human operators may interact with various systems on an aircraft. This interaction is facilitated through the use of different types of control systems. The control systems may include keys, buttons, switches, and other types of controls. Additionally, the control systems also may include lights, displays, and other types of output devices. These control systems may be implemented as control units in which controls and a display screen are grouped together on the panel. With the different functions and locations for control panels in an aircraft, each control panel has a specialized design for a particular function and location of the control panel. Also, the design of the control panel may be based on the system controlled by the control panel.

For example, a control panel in a flight deck may include a display device and switches. In contrast, a control panel used in a cargo bay may have physical switches and lights. In yet another example, a control panel for an in-flight entertainment system in a passenger cabin may have a display in the form of a touch screen.

Also, the control panel may have physical buttons, switches, or other controls that are selected specifically for a particular system being controlled. In a similar fashion, the output devices also are tailored to the specific system managed by the control panel.

For example, a cargo bay may have switches in which each switch performs a particular function with respect to doors and other equipment in the cargo bay. The output devices may be lights with each light indicating the operation of a particular function in the cargo bay. As a result, control panels often are not interchangeable with each other.

Further, these control panels typically have larger numbers of wires, connectors, frames, and other components than desired. As a result, these control panels require larger amounts of space and have greater amounts of weight than desired for use in aircraft.

In addition, the maintenance effort for control units may be greater than desired. For example, an airline may maintain spare control units for all of the different types of control units used in the airline's aircraft. The number of spare control units may be greater than desired because the control units are not interchangeable with each other in aircraft. Further, with these different types of interfaces for systems on aircraft, increased complexity is present for assembling new aircraft.

Therefore, it would be illustrative to have a method and apparatus that takes into account at least some of the issues discussed above as well as possibly other issues.

SUMMARY

In one illustrative embodiment, a method is presented for managing a programmable control panel for a vehicle. A number of first level control functions is assigned to the programmable control panel for the vehicle. A number of second level control functions is assigned to the programmable control panel based on a health of programmable control panels in the vehicle.

In another illustrative embodiment, an apparatus comprises a programmable control panel configured to be connected to a vehicle. The programmable control panel is configured to receive a number of first level control functions to the programmable control panel for the vehicle and receive a number of second level control functions to the programmable control panel based on a health of programmable control panels in the vehicle.

In still another illustrative embodiment, a vehicle system comprises a plurality of systems and programmable control panels configured to control the plurality of systems. A programmable control panel in the programmable control panels is configured to perform a number of first level control functions to the programmable control panel for a vehicle. The programmable control panel in the programmable control panels is configured to perform a number of second level control functions to the programmable control panel based on a health of the programmable control panels in the vehicle.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof will best be understood by reference to the following detailed description of an illustrative embodiment of the present disclosure when read in conjunction with the accompanying drawings, wherein:

FIG. 3 is an illustration of a block diagram of data flow used in managing a programmable control panel in accordance with an illustrative embodiment;

FIG. 4 is an illustration of a block diagram of data flow used in managing a control panel in accordance with an illustrative embodiment;

FIGS. 5-7 are illustrations of block diagrams of interactions between programmable control panels in accordance with an illustrative embodiment;

FIGS. 8-11 are illustrations of block diagrams of interactions between programmable control panels in a vehicle in accordance with an illustrative embodiment;

FIG. 22 is an illustration of a data processing system in accordance with an illustrative embodiment;

FIG. 23 is an illustration of an aircraft manufacturing and service method in accordance with an illustrative embodiment; and FIG. 24 is an illustration of an aircraft in which an illustrative embodiment may be implemented.

DETAILED DESCRIPTION

The different illustrative embodiments recognize and take into account one or more different considerations. For example, the different illustrative embodiments recognize and take into account that control units may be designed to be interchangeable and provide different functions. The different illustrative embodiments recognize and take into account that data processing systems may be implemented into a control panel. As a result, a control panel may be programmed and used in different locations. In this fashion, control panels may be interchangeable with each other. When control panels are interchangeable, the number of control panels that need to be maintained as spares may be reduced.

The different illustrative embodiments also recognize and take into account that with currently used control panels, the replacement of a control unit may be infeasible during flight or other operations if that control panel is not operating as desired. The different illustrative embodiments recognize and take into account that a control panel may be designed with a processor unit that runs software. With a processor unit, functions in the control panel may be changed using software changes. This type of control panel is a programmable control panel. As a result, a programmable control panel in one location may be more easily interchangeable with another programmable control panel in another location.

Thus, the different illustrative embodiments provide a method and apparatus for managing control panels in a vehicle. A number of first level control functions are assigned to a control panel in the control panels for a vehicle. A number of second level control functions are assigned to the control panel based on the health of the control panels in the vehicle.

Figure 1:
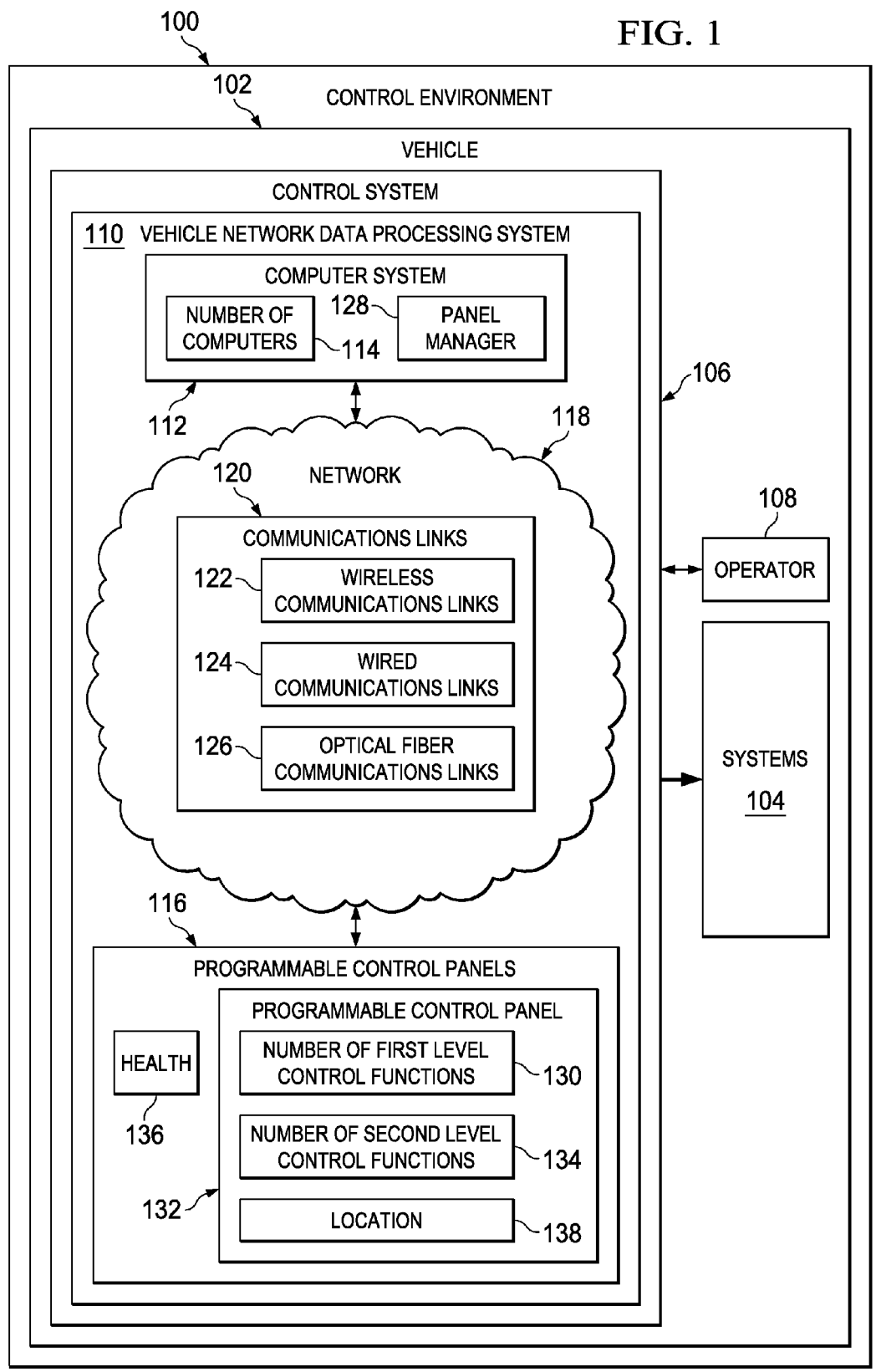
FIG. 1 is an illustration of a block diagram of a control environment in accordance with an illustrative embodiment.

With reference now to the figures and, in particular, with reference to FIG. 1, an illustration of a block diagram of a control environment is depicted in accordance with an illustrative embodiment. Control environment 100 includes vehicle 102. Systems 104 are present in vehicle 102. These systems may include, for example, without limitation, an engine control system, an environmental system, a hydraulic system, an entertainment system, and other suitable types of systems.

Control system 106 controls systems 104 in these illustrative examples. Operator 108 in vehicle 102 may interact with control system 106 to obtain information and input commands to systems 104.

As depicted, control system 106 includes vehicle network data processing system 110. Computer system 112 is present in vehicle network data processing system 110 in this illustrative example.

Computer system 112 comprises number of computers 114. As used herein, a "number", when used with reference to items, means one or more items. For example, "number of computers 114" is one or more computers.

Computer system 112 is configured to perform different operations for vehicle 102. For example, without limitation, computer system 112 may monitor systems 104, perform autopilot functions, provide navigation information, store software, and provide other suitable functions within vehicle 102.

Additionally, vehicle network data processing system 110 also includes programmable control panels 116. Number of computers 114 and programmable control panels 116 may communicate with each other using network 118. Network 118 comprises communications links 120. Communications links 120 may include at least one of wireless communications links 122, wired communications links 124, optical fiber communications links 126, and other suitable types of communications links.

As used herein, the phrase "at least one of", when used with a list of items, means different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In these illustrative examples, programmable control panels 116 are hardware devices that are configured to control systems 104. Programmable control panels 116 also include software in the illustrative examples.

Programmable control panels 116 all may be of the same size or may have different sizes, depending on the particular implementation. For example, different groups of sizes may be present for different systems.

In these illustrative examples, programmable control panels 116 may be programmed to control particular systems within systems 104. The programming of programmable control panels 116 is performed using panel manager 128 in the illustrative examples. Panel manager 128 may be implemented using hardware, software, or a combination of the two. In this illustrative example, panel manager 128 is implemented within computer system 112 in vehicle network data processing system 110.

For example, number of first level control functions 130 are assigned to programmable control panel 132. Number of second level control functions 134 are assigned to programmable control panel 132 based on health 136 of programmable control panels 116.

Number of first level control functions 130 may be assigned to programmable control panel 132 based on location 138 of programmable control panel 132 in vehicle 102. For example, number of first level control functions 130 may control a cargo door and cargo movement systems when programmable control panel 132 is located in a cargo bay. If programmable control panel 132 is located in a passenger cabin, number of first level control functions 130 may control an in-flight entertainment system, an environmental system, or some other suitable system associated with the passenger cabin.

In this illustrative example, number of first level control functions 130 is a number of primary control functions for programmable control panel 132. In other words, number of first level control functions 130 is the number of control functions normally provided by programmable control panel 132. These are functions controlled by the system assigned to programmable control panel 132 in the illustrative examples.

Number of second level control functions 134 is a number of additional control functions that may be provided by programmable control panels 116. Number of second level control functions 134 may be control functions for one or more other programmable control panels within programmable control panels 116. With number of second level control functions 134, programmable control panel 132 may be configured to control additional systems in addition to the system controller using number of first level control functions 130.

Number of second level control functions 134 may be assigned to programmable control panel 132 when other control panels in programmable control panels 116 are not functioning as desired. Whether a control panel in programmable control panels 116 is functioning as desired is based on identifying health 136 of programmable control panels 116. Panel manager 128 is configured to assign these functions to programmable control panel 132 as well as other programmable control panels in programmable control panels 116.

In some illustrative examples, programmable control panels 116 may communicate with each other and assign functions to each other. This communication may take place over network 118 or without network 118. For example, the communication between programmable control panels 116 may be, for example, in a peer-to-peer form in which communications links 120 are between programmable control panels 116. In this fashion, each programmable control panel in programmable control panels 116 may receive and forward messages from other programmable control panels.

The illustration of control environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, panel manager 128 may not be in vehicle 102. For example, when more than one computer is present in computer system 112, a first portion of computer system 112 may be on vehicle 102, and a second portion of computer system 112 may be in a location remote to vehicle 102. With this example, panel manager 128 may be on the second portion of computer system 112 in the remote location. As another example, panel manager 128 may be distributed and may be located on both the first portion of computer system 112 in vehicle 102 and in the second portion of computer system 112 located remotely to vehicle 102.

In still other illustrative examples, computer system 112 may be omitted from vehicle network data processing system 110. Instead, panel manager 128 may be located on programmable control panel 132 or another programmable control panel in programmable control panels 116.

Figure 2:
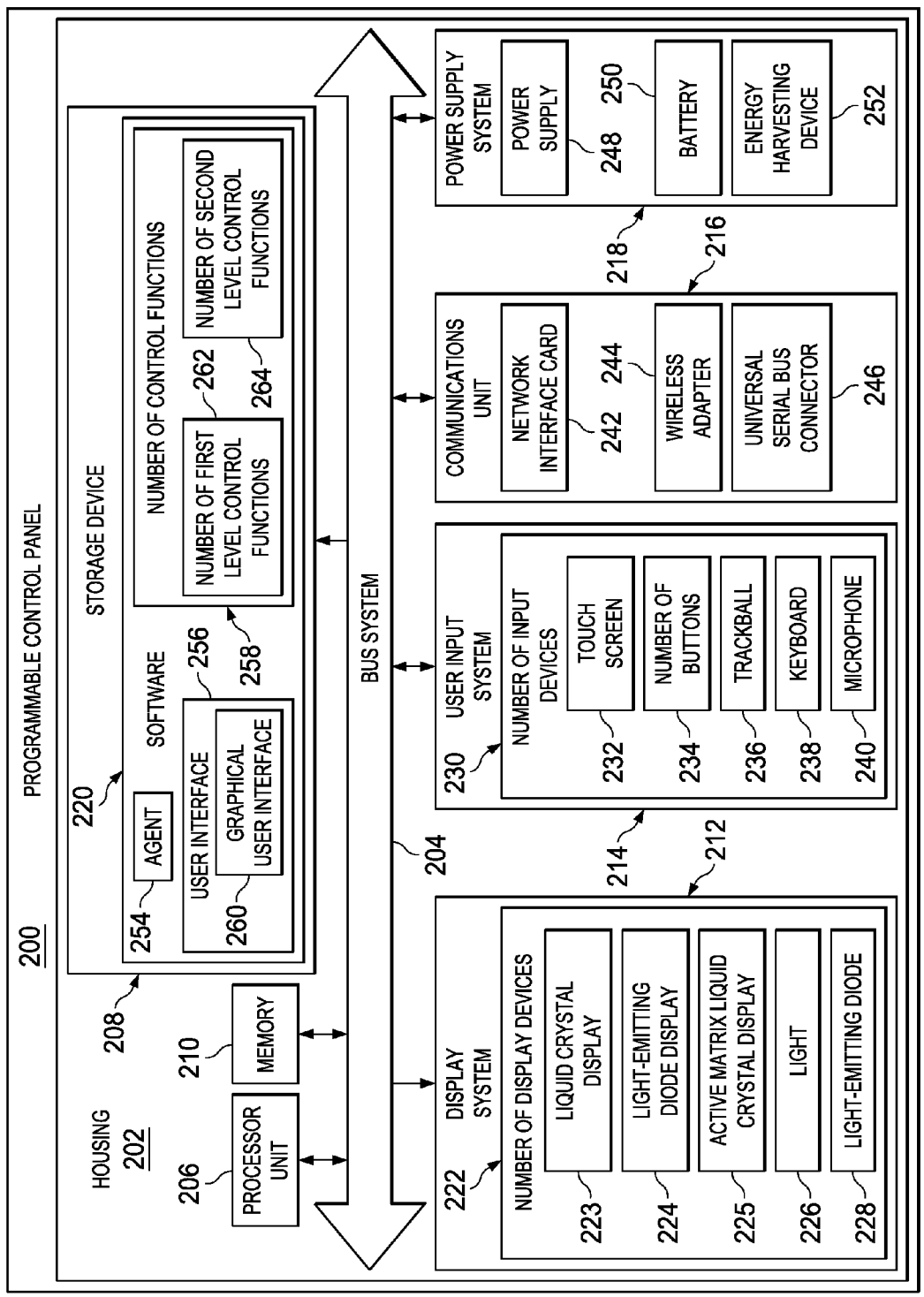
FIG. 2 is an illustration of a block diagram of a programmable control panel in accordance with an illustrative embodiment.

Turning now to FIG. 2, an illustration of a block diagram of a programmable control panel is depicted in accordance with an illustrative embodiment. Programmable control panel 200 is an example of one implementation for programmable control panel 132 in FIG. 1.

As depicted, programmable control panel 200 includes housing 202. Housing 202 is a physical structure configured to hold components in programmable control panel 200.

Programmable control panel 200 also includes bus system 204. Bus system 204 is configured to provide communications, power, or a combination of the two to different components within programmable control panel 200. In this illustrative example, processor unit 206, storage device 208, memory 210, display system 212, user input system 214, communications unit 216, and power supply system 218 are connected to bus system 204. These components are physical components that are physically associated with housing 202.

Processor unit 206 is configured to run software 220. Processor unit 206 may be a number of processors, a multi-processor core, or some other type of processor. In these illustrative examples, storage device 208 is a piece of hardware capable of storing information. For example, storage device 208 is configured to store software 220. Software 220 may be run by processor unit 206 from storage device 208 through memory 210.

Memory 210 may be a volatile or nonvolatile storage device. Memory 210 may serve as temporary storage for information, such as data and software, being run by processor unit 206.

In these illustrative examples, storage device 208 may be a hard drive, a flash memory, or some other suitable type of storage. Memory 210 may be a random access memory or some other suitable type of device.

In these illustrative examples, display system 212 may comprise number of display devices 222. A display device in number of display devices 222 may take different forms. For example, a display device may be implemented using liquid crystal display 223, organic light-emitting diode display 224, active matrix liquid crystal display (AMLCD) 225, or any other suitable type of display device. In still other illustrative examples, a display device in number of display devices 222 may be as simple as light 226 or light-emitting diode 228.

User input system 214 is configured to receive user input from an operator. User input system 214 may comprise number of input devices 230. Number of input devices 230 may include, for example, at least one of touch screen 232, number of buttons 234, trackball 236, keyboard 238, microphone 240, and other suitable types of input devices. Of course, combinations of these and other input devices may be used, depending on the particular implementation. For example, number of buttons 234 may include a capacitive button that may be placed on or associated with touch screen 232. As another illustrative example, trackball 236 may be present on programmable control panel 200 and may be with touch screen 232. Other combinations of devices may be used for number of input devices 230, depending on the particular implementation.

As depicted, communications unit 216 is configured to provide communication between programmable control panel 200 and other data processing devices in vehicle network data processing system 110 in FIG. 1. In some illustrative examples, communications unit 216 may be configured to provide communication between programmable control panel 200 and other programmable control panels though a peer-to-peer connection between the programmable control panels. Communications unit 216 may be, for example, at least one of network interface card 242, wireless adapter 244, universal serial bus connector 246, and other suitable types of communication devices.

In these illustrative examples, power supply system 218 is configured to provide power to the different components in programmable control panel 200. Power supply system 218 may include at least one of power supply 248, battery 250, energy harvesting device 252, and other suitable types of power devices. Power supply 248 may be an alternating current power supply that converts an alternating current into a direct current for use by components in programmable control panel 200. Battery 250 may provide power as a backup to power supply 248 or may be a main power source within power supply system 218.

Further, power supply 248 may include multiple types of input power. For example, power supply 248 may include a primary power line with a redundant power line as a backup. As another illustrative example, battery 250 may comprise multiple battery units that may provide power. Further, battery 250 may serve to store excess power that may be generated by energy harvesting device 252.

Energy harvesting device 252 may be a device that generates energy from the environment around programmable control panel 200. Energy harvesting device 252 may include a piezoelectric energy harvesting device, an ambient radiation energy harvesting device, a thermal electric generator, and other suitable types of energy harvesting devices.

In these illustrative examples, software 220 may include software for agent 254, user interface 256, and number of control functions 258. Agent 254 is configured to manage number of control functions 258. Additionally, agent 254 also may be configured to identify the health of programmable control panel 200. For example, agent 254 may run diagnostic processes to determine whether programmable control panel 200 is operating as desired. User interface 256 may be graphical user interface 260 displayed on number of display devices 222.

Number of control functions 258 may include number of first level control functions 262 and number of second level control functions 264. Interaction with these functions may be performed through user interface 256.

With reference now to FIG. 3, an illustration of a block diagram of data flow used in managing a programmable control panel is depicted in accordance with an illustrative embodiment. In this illustrative example, panel manager 128 is located in a facility rather than in vehicle 102 in FIG. 1.

Panel manager 128 is configured to assign functions to programmable control panel 132. In this illustrative example, programmable control panel 132 has not been programmed with control functions for a system. In this illustrative example, programmable control panel 132 is programmed prior to installation of programmable control panel 132 in a vehicle.

In these illustrative examples, panel manager 128 receives input 306. Input 306 may be, for example, without limitation, a user input, a configuration file, a command, or some other suitable form of input.

In response to receiving input 306, panel manager 128 identifies number of first level control functions 130 from functions 310 in function database 312. In these illustrative examples, functions 310 in function database 312 are functions for control panels that may be used with different vehicles in the illustrative examples. The selection of number of first level control functions 130 from functions 310 is performed using input 306.

Input 306 may be a selection of number of first level control functions 130. In other illustrative examples, input 306 may be an identification of the vehicle and the location in which programmable control panel 132 is to be used.

Panel manager 128 sends software 314 containing number of first level control functions 130 to programmable control panel 132. In this illustrative example, agent 316 is configured to receive and install software 314 on programmable control panel 132. Installing software 314 causes number of first level control functions 130 to be present in programmable control panel 132. In these illustrative examples, agent 316 may be software, hardware, or a combination of the two.

Programmable control panel 132 is now ready for installation in a vehicle. In these illustrative examples, programmable control panel 132 is designated for a particular location in vehicle 102 in which number of first level control functions 130 is to be used to control a system.

Turning now to FIG. 4, an illustration of a block diagram of data flow used in managing a control panel is depicted in accordance with an illustrative embodiment. In this illustrative example, programmable control panel 132 has not been pre-programmed.

Agent 405 in programmable control panel 132 sends identification information 406 to panel manager 128 after programmable control panel 132 has been installed in vehicle 102 in FIG. 1. Identification information 406 includes information used by panel manager 128 to assign functions to programmable control panel 132.

In these illustrative examples, identification information 406 may include at least one of location 408, identifier 410, configuration 412, and other suitable information. Location 408 is a location of programmable control panel 132 in vehicle 102. One manner in which location 408 may be identified is by the user inputting location 408 into programmable control panel 132. In another example, location 408 may be identified based on the network port to which programmable control panel 132 is connected.

For example, a number may be associated with or coded within the network port.

In yet another example, location 408 may be identified by panel manager 128 using an Internet protocol address for programmable control panel 132. The Internet protocol address may be programmed into programmable control panel 132 based on location 408 for programmable control panel 132. As a result, panel manager 128 may identify location 408 based on the Internet protocol address sent by agent 405 in programmable control panel 132. In other words, the Internet protocol address may be sent and used to identify location 408 if location 408 is not included in identification information 406 sent by agent 405.

Identifier 410 may be a unique identifier for programmable control panel 132. This unique identifier may be used in part to identify functions for programmable control panel 132. Identifier 410 may be a processor identifier, a media access control (MAC) identifier, or some other suitable type of identifier. Configuration 412 contains information about the configuration of programmable control panel 132. Configuration 412 may be used to identify particular software that is used by programmable control panel 132 to perform different functions.

In response to receiving identification information 406, panel manager 128 identifies number of first level control functions 130 for programmable control panel 132. Number of first level control functions 130 are identified from functions 416 in function database 418. In this illustrative example, function database 418 is located in a computer system in vehicle 102. Of course, in other illustrative examples, function database 418 may be in a remote location and accessed through a wireless communications link.

Panel manager 128 sends software 420 to agent 405. Software 420 includes number of first level control functions 130 assigned to programmable control panel 132.

In response to receiving software 420, agent 405 installs software 420. Programmable control panel 132 is now configured to provide number of first level control functions 130.

Additionally, programmable control panel 132 also may be assigned number of second level control functions 134. Number of second level control functions 134 may be used to control another system assigned to programmable control panel 132. This type of programming may be performed for other programmable control panels in programmable control panels 422 when the other programmable control panels are installed in vehicle 102. Programmable control panels 422 are other programmable control panels in programmable control panels 116 in FIG. 1 other than programmable control panel 132.

In the illustrative examples, panel manager 128 monitors the health of programmable control panel 132 and programmable control panels 422 in programmable control panels 116.

Depending on the health of programmable control panels 422, panel manager 128 may assign one or more new functions to programmable control panel 132. The one or more new functions are number of second level control functions 134.

For example, if the health for programmable control panel 429 in programmable control panels 422 indicates that programmable control panel 429 in programmable control panels 422 is not operating as desired, panel manager 128 identifies number of second level control functions 134 from functions 416 in function database 418. Number of second level control functions 134 is number of first level control functions 432 for programmable control panel 429 in the depicted example.

In response to identifying number of second level control functions 134, panel manager 128 sends software 434 for number of second level control functions 134 to programmable control panel 132. In response to receiving software 434, agent 405 installs software 434 to include number of second level control functions 134 on programmable control panel 132. As a result, programmable control panel 132 is now configured to provide number of first level control functions 130 and number of second level control functions 134.

In these illustrative examples, the selection of programmable control panel 132 to provide number of second level control functions 134 is based on location 408 of programmable control panel 132. The selection also is based on the proximity of location 408 to location 444 for programmable control panel 429. For example, location 408 of programmable control panel 132 may be within an area in which programmable control panel 429 is located. For example, if both programmable control panel 132 and programmable control panel 429 are located on the same wall in a cargo bay, the location may be considered to be a close enough proximity between the two programmable control panels such that panel manager 128 selects programmable control panel 132 to take over functions normally performed by programmable control panel 429. As a result, programmable control panel 132 may perform its functions as well as those for programmable control panel 429.

In these illustrative examples, the health of the programmable control panels may be identified in a number of different ways. For example, diagnostic processes may be performed in programmable control panel 132 and programmable control panel 429. These diagnostic functions may indicate the health of the programmable control panels.

In another illustrative example, a user may input information to indicate the health of programmable control panel 429. For example, a user may input a code. As another example, the user's hand may be placed on the display for a period of time, or provide some other suitable user input that may cause the panel to take itself out of service. This type of user input may be used when the user discovers that programmable control panel 429 is not operating as desired. This input may cause programmable control panel 429 to send a message indicating that programmable control panel 429 is not operating as desired.

In another illustrative example, panel manager 128 may use a heartbeat system in which panel manager 128 expects to receive a signal or message from programmable control panels 422 within a selected period of time. If the message is not received from a particular programmable control panel within the selected period of time, then the particular programmable control panel may be considered as not operating as desired.

If the diagnostic functions indicate that a programmable control panel is not operating as desired, the agent on the programmable control panel may send a request for help. This request for help may be considered an indicator or information about the health of the programmable control panel.

Turning now to FIGS. 5-7, illustrations of block diagrams of interactions between programmable control panels are depicted in accordance with an illustrative embodiment. In FIG. 5, programmable control panels 500, 502, and 504 are examples of programmable control panels within programmable control panels 116 in FIG. 1. As depicted, programmable control panels 500, 502, and 504 communicate with each other using network 118. Alternatively, these programmable control panels may communicate directly with each other through wireless communications links without using network 118.

In this illustrative example, programmable control panel 500 has function 1, function 2, and function 3 in storage device 510. Function 1 is a first level control function that is operational. Function 2 and function 3 are stored in storage device 510 as the second level control functions. In this illustrative example, agent 511 is configured to manage the functions in storage device 510.

Programmable control panel 502 has function 1, function 2, and function 3 in storage device 512. Agent 513 is also present on programmable control panel 502.

Function 2 is a first level control function that is currently operating. Function 1 and function 3 are second level control functions in programmable control panel 502.

Programmable control panel 504 is a new programmable control panel in this illustrative example. No functions are currently stored in storage device 514 in this illustrative example.

Agent 515 is present on programmable control panel 504. Functions are currently absent in storage device 514 of programmable control panel 504.

Turning next to FIG. 6, agent 515 sends identification information 600 to network 118. In these illustrative examples, identification information 600 may include information about the location of programmable control panel 504, a configuration of programmable control panel 504, an identifier for programmable control panel 504, and/or other suitable information.

In FIG. 7, agent 511 on programmable control panel 500 sends software 700 to programmable control panel 504 in response to identification information 600 in FIG. 6 being sent to network 118. Agent 513 on programmable control panel 502 sends software 702 to programmable control panel 504 in response to identification information 600 being sent to network 118. Software 700 and software 702 are used by agent 515 on programmable control panel 504 to install one or more functions to be provided by programmable control panel 504.

In FIG. 7, agent 515 on programmable control panel 504 installs at least one of software 700 and software 702 to configure programmable control panel 504 to provide function 1, function 2, and function 3 in storage device 514. Function 3 is the first level control function in programmable control panel 504 while function 1 and function 2 are second level control functions. In this manner, programmable control panels 500, 502, and 504 may interact with each other to provide assignment of functions to programmable control panel 504 after its installation.

Turning now to FIGS. 8-11, illustrations of block diagrams of interactions between programmable control panels in a vehicle are depicted in accordance with an illustrative embodiment. In FIG. 8, programmable control panels 800, 802, and 804 are examples of programmable control panels in programmable control panels 116 in FIG. 1.

These programmable control panels communicate with each other in a peer-to-peer fashion in this particular example. This communication is performed through agent 818 on programmable control panel 800, agent 820 on programmable control panel 802, and agent 822 on programmable control panel 804. For example, agent 818 on programmable control panel 800 may send communications to agent 820 on programmable control panel 802. In turn, agent 820 on programmable control panel 802 may perform operations using the communications or may forward the communications to agent 822 on programmable control panel 804. In a similar fashion, agent 818 on programmable control panel 800 may perform actions based on receiving communications from agent 820 on programmable control panel 802 and may forward the communications received from agent 820 on programmable control panel 802 to network 118 in this illustrative example. These communications then may be received by panel manager 128.

As depicted, programmable control panel 800 has function 1 in storage device 812. Function 1 is a primary control function in programmable control panel 800. Programmable control panel 802 has function 2 in storage device 814. Function 2 is a primary control function in programmable control panel 802. Programmable control panel 804 does not have a control function in storage device 816. Storage device 816, however, should have a control function. In this illustrative example, storage device 816 is not operating as desired. As a result, no control functions are provided by programmable control panel 804.

More specifically, storage device 816 has failed in this particular example. In this illustrative example, the failure of storage device 816 may be identified by agent 822 running diagnostic routines to identify the health of different components on programmable control panel 804.

In FIG. 9, agent 822 on programmable control panel 804 sends help request 900 to agent 820 on programmable control panel 802 in response to detecting a failure of storage device 816.

Agent 820 on programmable control panel 802 sends help request 900 to agent 818 on programmable control panel 800. In turn, agent 818 sends help request 900 to aircraft network 118. Panel manager 128 may receive help request 900 from agent 818.

In response to receiving help request 900, panel manager 128 assigns one or more new functions to programmable control panel 800 and programmable control panel 802. In particular, a new second level control function is selected for programmable control panel 800 and programmable control panel 802. In this illustrative example, the second level function is function 3, which was performed by programmable control panel 804.

In FIG. 10, panel manager 128 sends function 3 in software 1000 and software 1002 back to programmable control panel 800 and programmable control panel 802, respectively. Upon receiving software 1000, in FIG. 11, agent 818 on programmable control panel 800 installs software 1000 in response to receiving software 1000. The installation of software 1000 adds function 3 as a second level control function in programmable control panel 800.

In a similar fashion, agent 820 on programmable control panel 802 installs software 1002 such that programmable control panel 802 provides function 2 and function 3. Function 3 is a second level control function, while function 2 is a first level control function in programmable control panel 802.

As a result, both programmable control panel 800 and programmable control panel 802 now include function 3 as a second level control function. In this manner, programmable control panel 800 and programmable control panel 802 may perform function 3 because programmable control panel 804 is unable to perform function 3.

The same function may be placed on both of these programmable control panels such that an operator may select one of the programmable control panels to perform function 3. Two panels are selected in this illustrative example in case it is undesirable that an operator be distracted or change the current function being performed by one of programmable control panel 800 or programmable control panel 802.

The illustrations of the components in FIGS. 2-11 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, programmable control panel 200 in FIG. 2 may include a global positioning system (GPS) receiver to identify its location within a vehicle. Of course, any type of location system may be used. In another illustrative example, programmable control panel 200 may include a radio frequency tag reader. The radio frequency tag reader may read radio frequency tags that provide information on locations. More specifically, radio frequency identification (RFID) tags may be placed at different locations in the aircraft. The placement may be such that programmable control panel 200 only may read one radio frequency identification tag at a time. Each radio frequency tag may provide programmable control panel 200 with location information about the location of the tag on the aircraft. Thus, when programmable control panel 200 is placed in a location, programmable control panel 200 may obtain information about the location of programmable control panel 200 from reading a radio frequency tag at the location.

As another example, panel managers in addition to panel manager 128 may be present to manage programmable control panels. Further, in some illustrative examples, a complete set of functions for all of the systems in a vehicle may be pre-programmed on programmable control panels 116. Instead of sending software, commands and configuration files, as well as other information, may be sent to programmable control panels 116 to activate desired control functions for each of the programmable control panels in programmable control panels 116.

Figure 12:
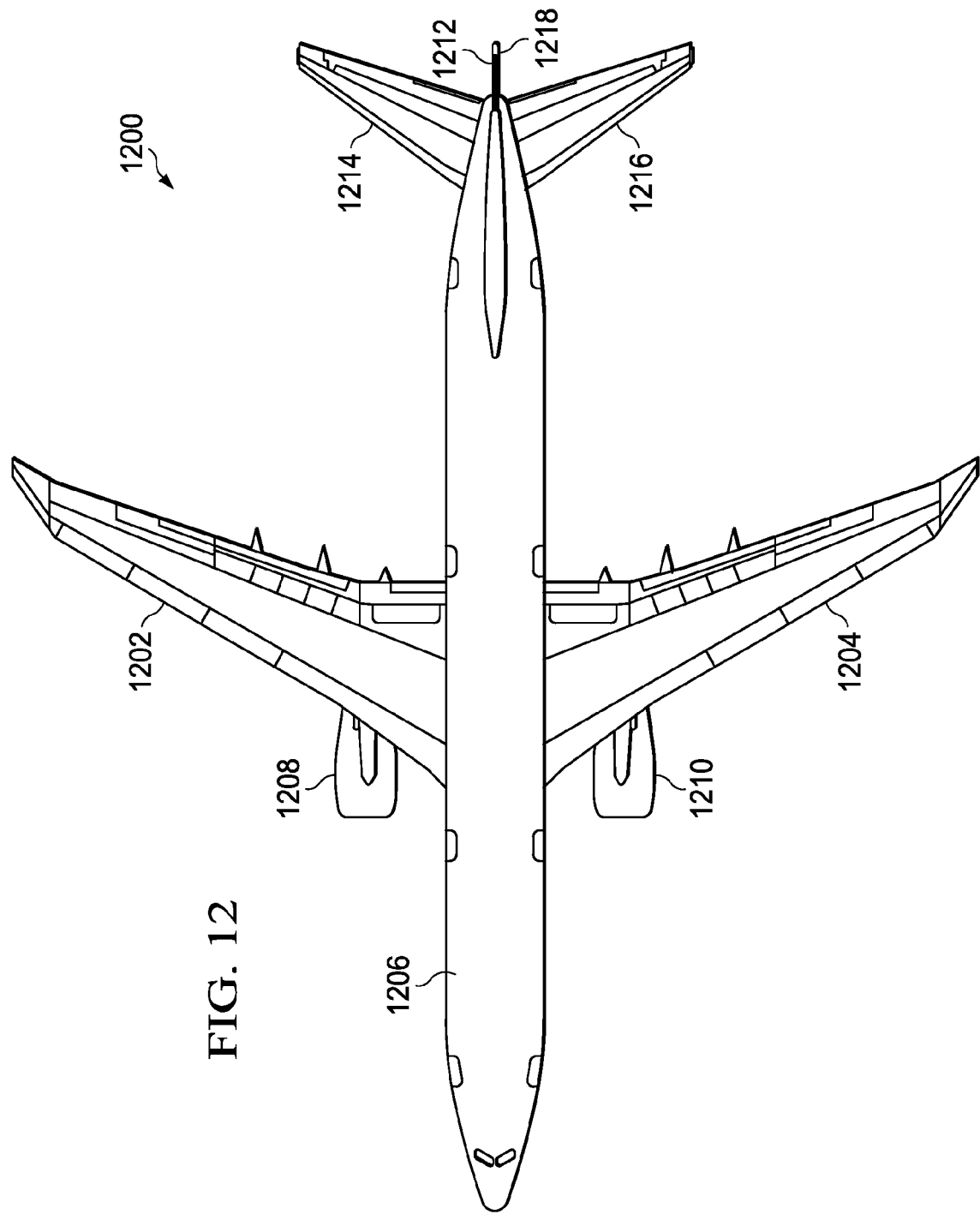
FIG. 12 is an illustration of an aircraft in accordance with an illustrative embodiment.

Turning now to FIG. 12, an illustration of an aircraft is depicted in accordance with an illustrative embodiment. In this illustrative example, aircraft 1200 is an example of one implementation for vehicle 102 in FIG. 1. Programmable control panels, such as programmable control panels 116, may be implemented and managed in aircraft 1200.

In this illustrative example, aircraft 1200 has wing 1202 and wing 1204 attached to body 1206. Additionally, engine 1208 is mounted on wing 1202, and engine 1210 is mounted on wing 1204. Tail section 1212 of body 1206 has horizontal stabilizer 1214, horizontal stabilizer 1216, and vertical stabilizer 1218.

Figure 13:
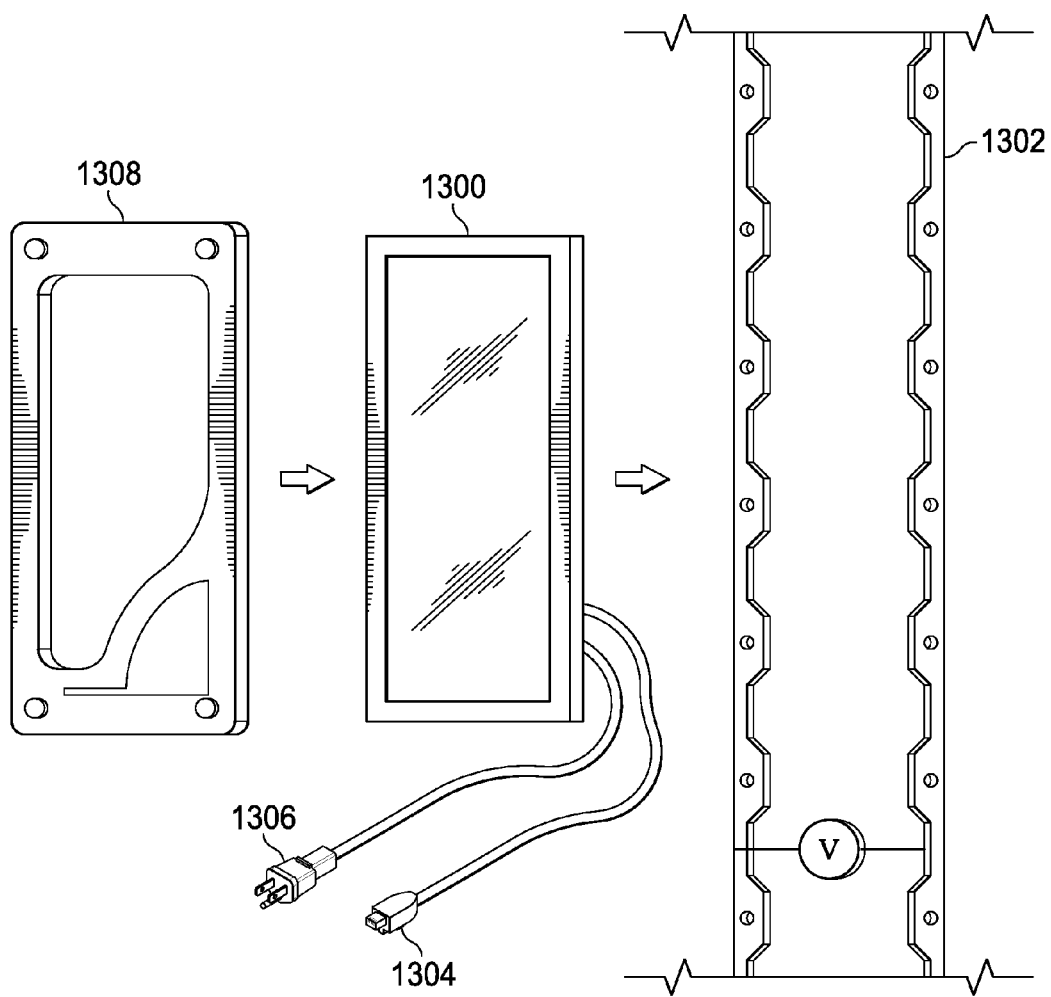
FIG. 13 is an illustration of a programmable control panel in accordance with an illustrative embodiment.

Turning now to FIG. 13, an illustration of a programmable control panel is depicted in accordance with an illustrative embodiment. Programmable control panel 1300 is an example of a physical implementation for a programmable control panel. Programmable control panel 1300 may be used to implemented programmable control panels 116 in FIG. 1 and programmable control panel 200 in FIG. 2.

In this illustrative example, programmable control panel 1300 may be mounted on frame 1302. As illustrated, frame 1302 comprises rails. These rails may provide power, depending on the implementation. Programmable control panel 1300 has data connector 1304 and power connector 1306. Data connector 1304 may be connected to a network. Power connector 1306 may be connected to a power source. Additionally, decorative bezel 1308 may be placed over programmable control panel 1300 when programmable control panel 1300 is mounted to frame 1302.

Figure 14:
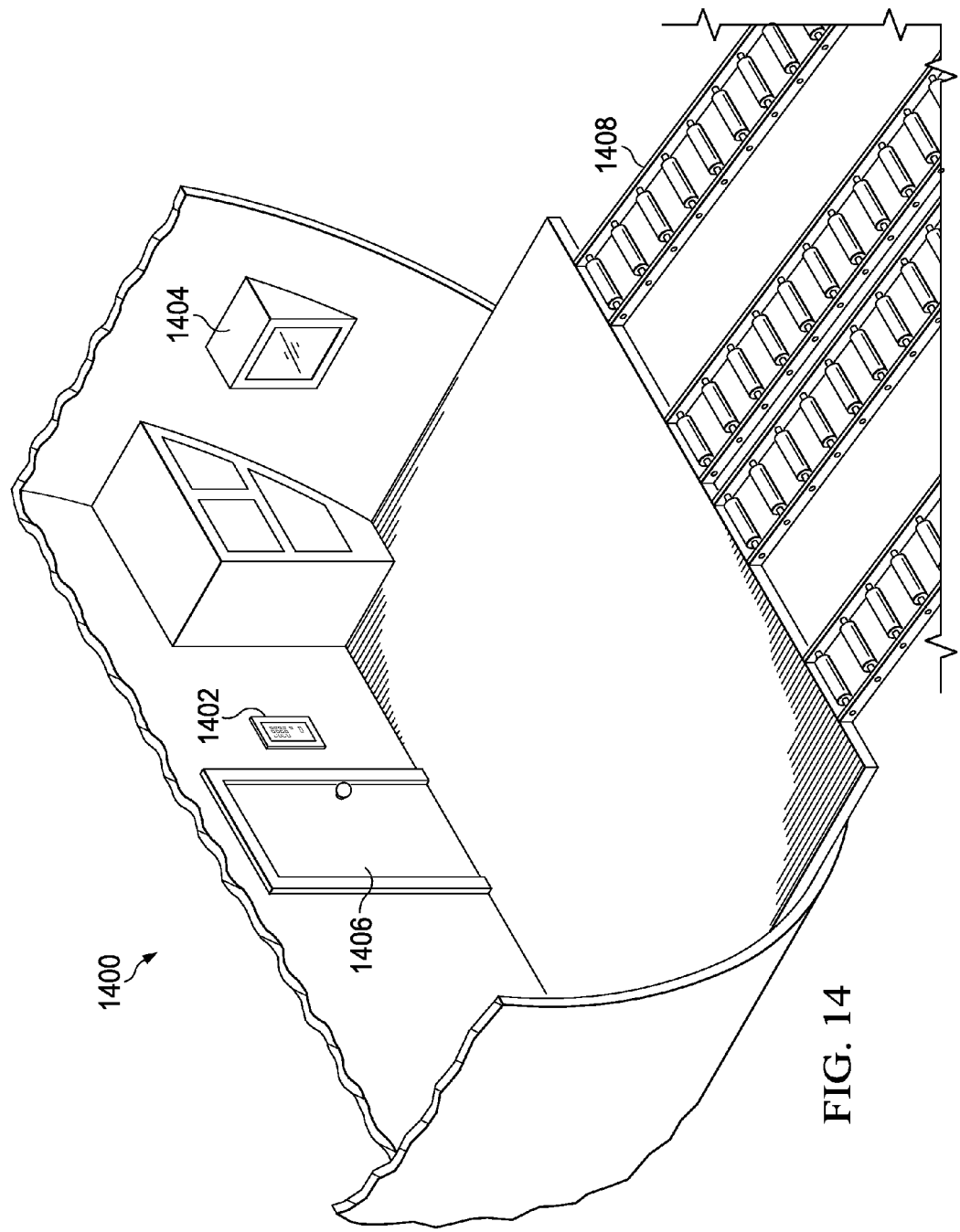
FIG. 14 is an illustration of a cargo area in an aircraft in accordance with an illustrative embodiment.

Turning now to FIG. 14, an illustration of a cargo area in an aircraft is depicted in accordance with an illustrative embodiment. In this illustrative example, cargo area 1400 is an example of a cargo area found in aircraft 1200 in FIG. 12. As depicted, programmable control panel 1402 and programmable control panel 1404 are present in cargo area 1400. These two programmable control panels may be implemented using a programmable control panel, such as programmable control panel 200 shown in block form in FIG. 2 and programmable control panel 1300 shown in physical form in FIG. 13.

Programmable control panel 1402 is configured to control access to door 1406. Programmable control panel 1404 is configured to control the movement of cargo movement system 1408. In this illustrative example, cargo movement system 1408 may comprise rollers that may be turned by motors in cargo area 1400.

In these illustrative examples, programmable control panel 1402 controls access to door 1406 as a first level control function. In these illustrative examples, if programmable control panel 1404 fails, software for the movement function for cargo movement system 1408 may be downloaded to programmable control panel 1402. As a result, programmable control panel 1402 may control both access to door 1406 and operation of cargo movement system 1408. In this example, operation of cargo movement system 1408 may be controlled using programmable control panel 1402 while cargo is loaded.

After flight begins, programmable control panel 1402 may be operated to control access to door 1406 and may become the first level control function. The functions to control these two systems may be selected through different mechanisms on programmable control panel 1402. For example, tabs may be used to select functions for either system, dual displays for both functions may be presented on programmable control panel 1402 at the same time, or some other type of interface may be used. Of course, other types of mechanisms may be used, depending on the particular implementation.

Figure 15:
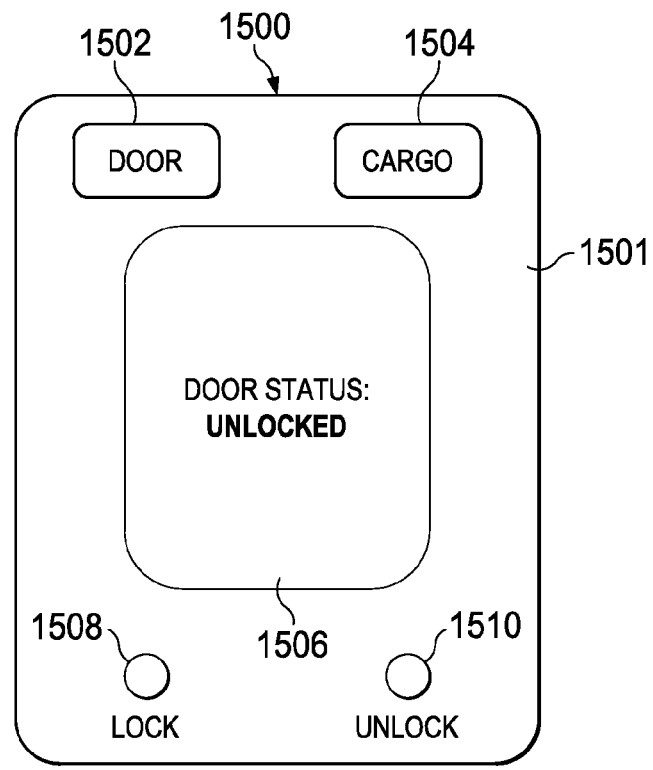
FIG. 15 is an illustration of a display for a programmable control panel in accordance with an illustrative embodiment.

Turning now to FIG. 15, an illustration of a display for a programmable control panel is depicted in accordance with an illustrative embodiment. In this illustrative example, display device 1500 is an example of a display on programmable control panel 1402 in FIG. 14. In this illustrative example, display device 1500 is one example of a display device in display system 212 in FIG. 2. As depicted, graphical user interface 1501 is displayed on display device 1500. Graphical user interface 1501 is an example of a graphical user interface for graphical user interface 260 in FIG. 2.

As depicted, graphical user interface 1501 has door tab 1502 and cargo tab 1504. Door tab 1502 is presently selected in this illustrative example. With door tab 1502 selected, graphical user interface 1501 shows the status of door 1406 in section 1506. Control 1508 may lock door 1406 in FIG. 14, while control 1510 unlocks door 1406.

Figure 16:
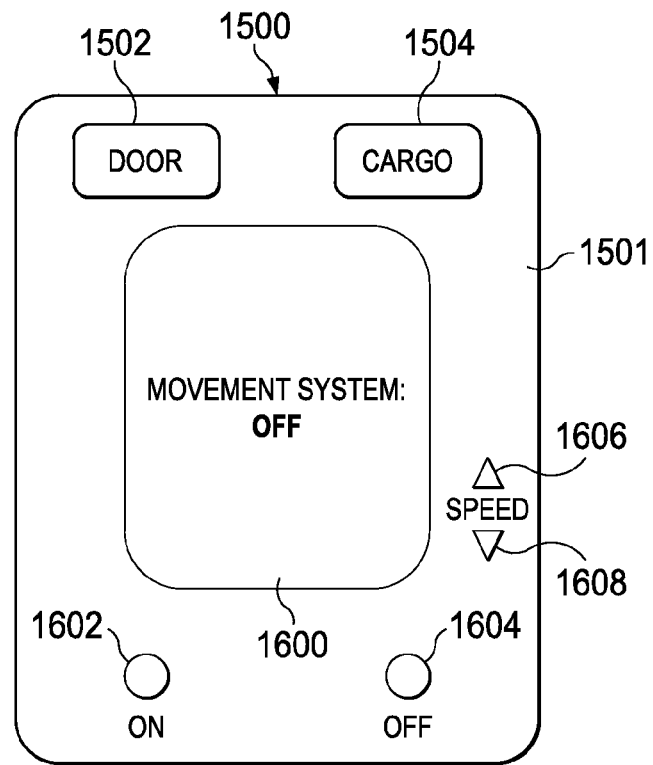
FIG. 16 is another illustration of a display for a programmable control panel in accordance with an illustrative embodiment.

Turning next to FIG. 16, another illustration of a display for a programmable control panel is depicted in accordance with an illustrative embodiment. In this illustrative example, cargo tab 1504 has been selected in graphical user interface 1501 displayed on display device 1500 of programmable control panel 1402 in FIG. 14. With the selection of cargo tab 1504, graphical user interface 1501 displays controls and information about cargo movement system 1408 in FIG. 14.

In this example, section 1600 indicates that cargo movement system 1408 is off. Cargo movement system 1408 may be turned on and off through control 1602 and control 1604, respectively. When cargo movement system 1408 is turned on, the speed of cargo movement system 1408 may be controlled through control 1606 and control 1608. In this illustrative example, these controls are second level control functions for programmable control panel 1402.

The illustration of display device 1500 and graphical user interface 1501 in FIG. 15 and FIG. 16 is not meant to limit the manner in which different displays may be configured for programmable control panels. For example, rather than using tabs, function buttons may be included on display device 1500. Further, although the illustrative examples show different controls on a touch screen for display device 1500, these controls may be associated with physical buttons in which labels may be displayed on display device 1500 to identify the functions performed by the physical buttons. These physical buttons may be, for example, without limitation, programmable physical buttons.

The different components illustrated in FIGS. 12-16 may be combined with components illustrated in block form in FIGS. 1-11, used with components in FIGS. 1-11, or a combination of the two. Additionally, some of the components illustrated in FIGS. 12-16 may be illustrative of how components shown in block form in FIGS. 1-11 may be implemented as physical objects.

Figure 17:
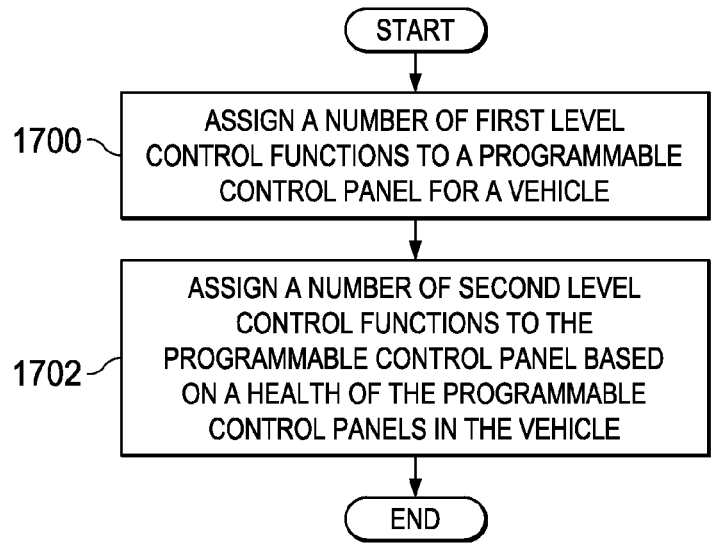
FIG. 17 is an illustration of a flowchart of a process for managing a programmable control panel in accordance with an illustrative embodiment.

With reference now to FIG. 17, an illustration of a flowchart of a process for managing a programmable control panel is depicted in accordance with an illustrative embodiment. The process illustrated in FIG. 17 may be implemented in panel manager 128 in FIG. 1.

The process begins by assigning a number of first level control functions to a programmable control panel for a vehicle (operation 1700). Next, a number of second level control functions are assigned to the programmable control panel based on a health of the programmable control panels in the vehicle (operation 1702), with the process terminating thereafter.

Figure 18:
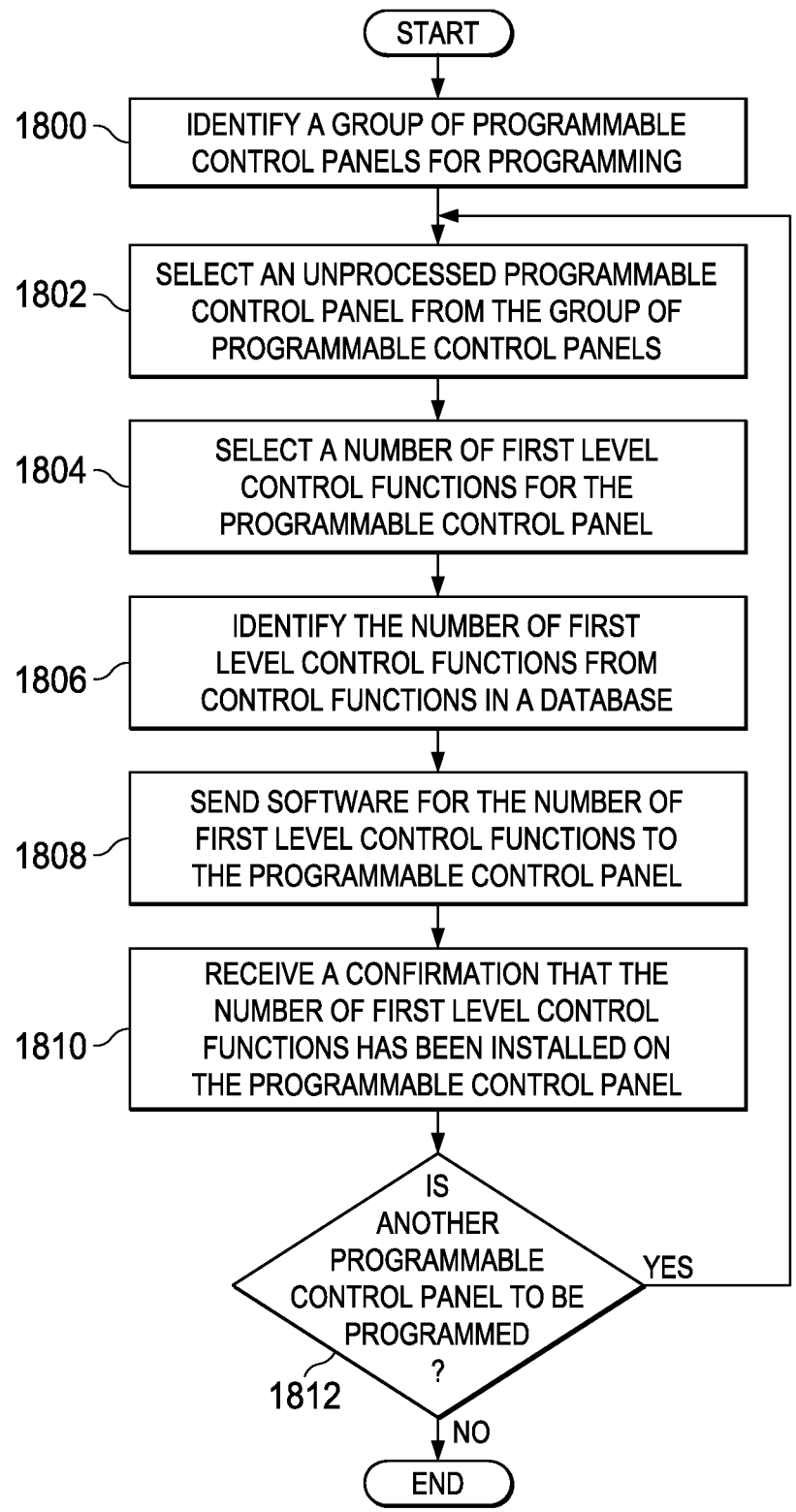
FIG. 18 is an illustration of a flowchart of a process for programming programmable control panels prior to installation on a vehicle in accordance with an illustrative embodiment.

Turning next to FIG. 18, an illustration of a flowchart of a process for programming programmable control panels prior to installation on a vehicle is depicted in accordance with an illustrative embodiment. This process may be implemented in panel manager 128 in FIG. 1.

The process begins by identifying a group of programmable control panels for programming (operation 1800). The process then selects an unprocessed programmable control panel from the group of programmable control panels (operation 1802).

Next, the process selects a number of first level control functions for the programmable control panel (operation

1804). Operation 1804 may be performed through input received by the controller. This input may be user input, a configuration file, or some other information.

With the user input, the process identifies the number of first level control functions from control functions in a database (operation 1806). The process then sends software for the number of first level control functions to the programmable control panel (operation 1808). The process then receives a confirmation that the number of first level control functions has been installed on the programmable control panel (operation 1810).

A determination is made as to whether another programmable control panel is to be programmed (operation 1812). If another programmable control panel is to be programmed, the process returns to operation 1802. Otherwise, the process terminates.

Figure 19:
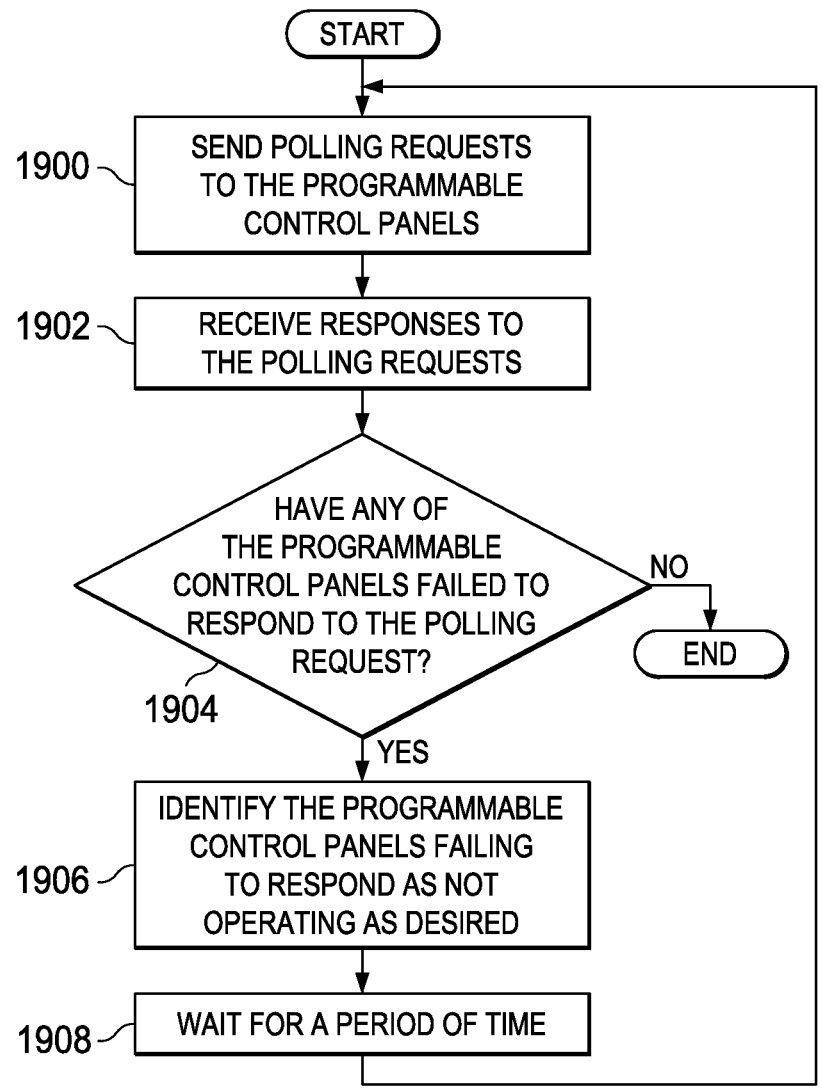
FIG. 19 is an illustration of a flowchart of a process for monitoring the health of programmable control panels in accordance with an illustrative embodiment.

Turning now to FIG. 19, an illustration of a flowchart of a process for monitoring the health of programmable control panels is depicted in accordance with an illustrative embodiment. This process may be implemented in panel manager 128 in FIG. 1. This process determines whether the programmable control panels are operating as desired. This information may be used to determine whether functions need to be reassigned from one programmable control panel to another programmable control panel.

The process begins by sending polling requests to the programmable control panels (operation 1900). The process receives responses to the polling requests (operation 1902). Next, a determination is made as to whether any of the programmable control panels have failed to respond to the polling request (operation 1904). If one or more programmable control panels have failed to respond to the polling request, the programmable control panels failing to respond are identified as not operating as desired (operation 1906). The process then waits for a period of time (operation 1908) and returns to operation 1900 as described above.

Returning again to operation 1904, if one or more programmable control panels has not failed to respond, the process terminates.

Figure 20:
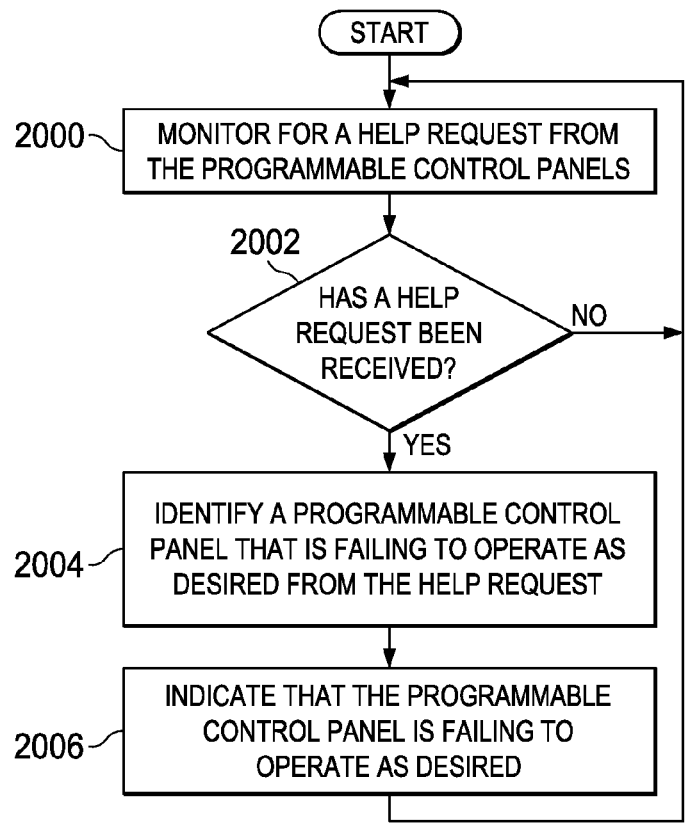
FIG. 20 is an illustration of a flowchart of a process for identifying the health of programmable control panels in accordance with an illustrative embodiment.

Turning now to FIG. 20, an illustration of a flowchart of a process for identifying the health of programmable control panels is depicted in accordance with an illustrative embodiment. The process illustrated in FIG. 20 may be implemented in panel manager 128 in FIG. 1.

In this illustrative example, the process monitors for a help request from the programmable control panels (operation 2000). A determination is made as to whether a help request has been received (operation 2002). If a help request has not been received, the process returns to operation 2000.

With reference again to operation 2002, if a help request is received, a programmable control panel that is failing to operate as desired is identified from the help request (operation 2004). The help request may be sent directly from the programmable control panel that is not operating as desired in some cases. In other cases, a programmable control panel may detect that another programmable control panel is not operating as desired and send the help request.

The process then indicates that the programmable control panel is failing to operate as desired (operation 2006), with the process then returning to operation 2000 as described above.

Figure 21:
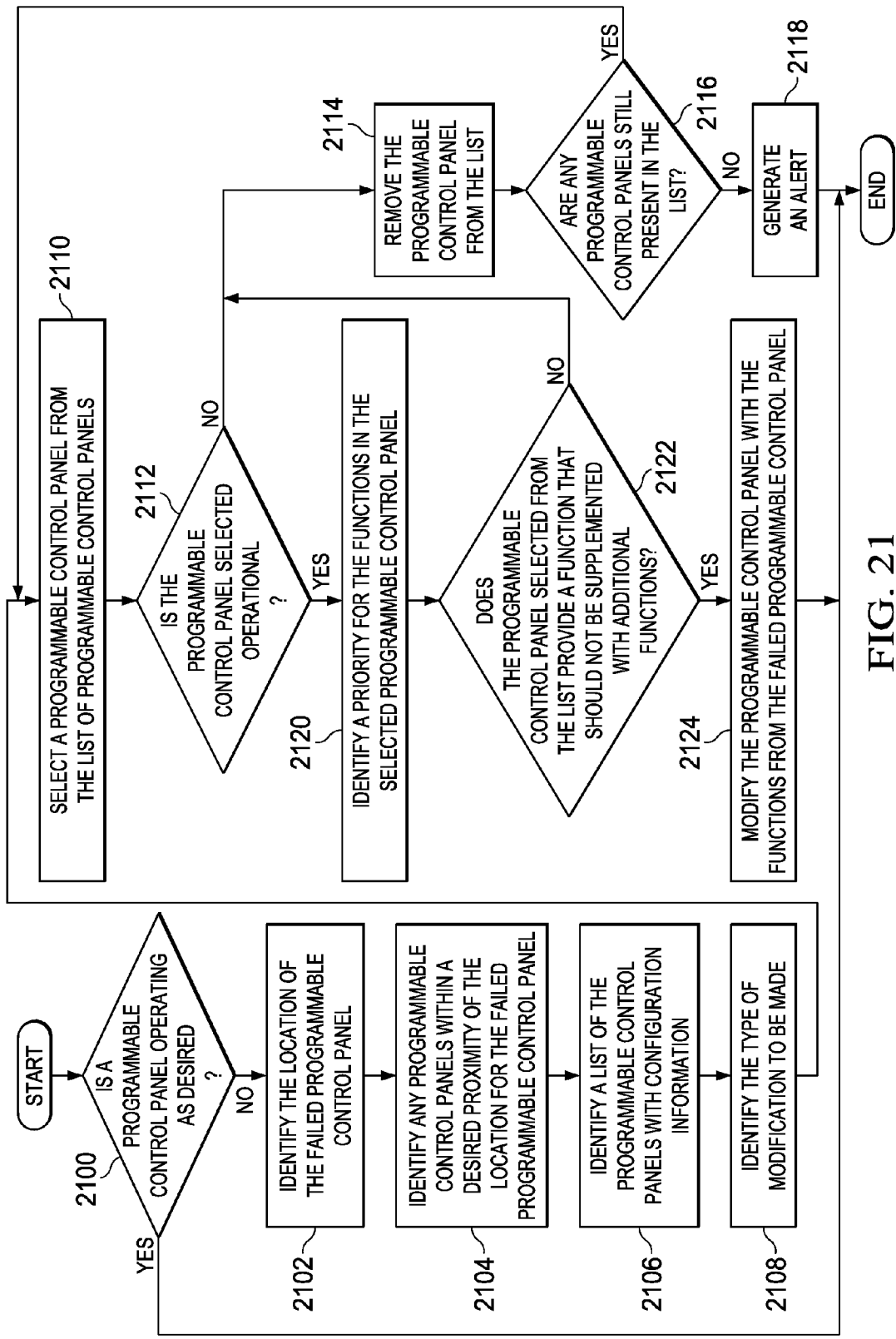
FIG. 21 is an illustration of a flowchart of a process for assigning functions to control panels in accordance with an illustrative embodiment.

With reference now to FIG. 21, an illustration of a flowchart of a process for assigning functions to control panels is depicted in accordance with an illustrative embodiment. The process illustrated in FIG. 21 may be implemented in panel manager 128 in FIG. 1.

The process begins by determining whether a programmable control panel is operating as desired (operation 2100). If a programmable control panel is operating as desired, the process terminates. If a programmable control panel has been identified as not operating as desired, the process then identifies the location of the failed programmable control panel (operation 2102).

Thereafter, the process identifies any programmable control panels within a desired proximity of the location for the failed programmable control panel (operation 2104). Programmable control panels may be identified as being in a desired proximity in a number of different ways. For example, the identification may be based on the location of the programmable control panel relative to the failed programmable control panel. For example, programmable control panels within a desired proximity may be those within the same zone, compartment, or a selected distance from the failed programmable control panel.

After identifying programmable control panels within the desired proximity, a list of the programmable control panels with configuration information is identified (operation 2106). This list is used to identify a potential programmable control panel to be configured to include a number of functions formed by the programmable control panel that is not operating as desired. This list of programmable control panels may include information about the programmable control panels. The information may be, for example, type of display, processor speed, type of operating speed, type of interface, and other suitable information.

The process then identifies the type of modification to be made (operation 2108). In these illustrative examples, the modification in operation 2108 is a modification to the manner in which a programmable control panel operates. The modification may include changes to the interface, additional functions, and other suitable modifications to allow the programmable control panel to control a system previously controlled by the programmable control panel that is no longer operating as desired. The modification may be, for example, adding a tab, overriding the current control functions with the control functions for the failed programmable control panel module, providing dual displays for the number of first level control functions and the number of second level control functions, or some other suitable type of modification.

The process then selects a programmable control panel from the list of programmable control panels (operation 2110). The selection of the programmable control panel may be performed in a number of different ways. For example, the programmable control panel may be selected as one closest to the failed programmable control panel based on the current functions being provided by the programmable control panels in the list and other suitable factors.

The process determines whether the programmable control panel selected is operational (operation 2112). If the programmable control panel is not operational, the process removes the programmable control panel from the list (operation 2114). Thereafter, the process determines whether any programmable control panels are still present in the list (operation 2116). If one or more additional programmable control panels are not present, the process generates an alert (operation 2118), with the process terminating thereafter. Otherwise, the process returns to operation 2110 as described above. The alert may be an audio alert, a visual alert, an email message, a maintenance system message, or some other suitable type of alert. Further, the alert may be generated and sent in multiple types of forms, depending on the particular implementation. For example, the alert may be presented in a cockpit or control center. Additionally, the alert may be transmitted to a remote location from the vehicle.

With reference again to operation 2112, if the selected programmable control panel is functional, the process then identifies a priority for the functions in the selected programmable control panel (operation 2120). In some cases, the functions in the failed programmable control panel may have a higher priority over the functions in the selected programmable control panel. The functions with the highest priority are the first level control functions, while the other functions are second level control functions in these illustrative examples. Functions with a higher priority may be displayed as a default display with other functions having a lower priority being displayed in response to a selection of a tab.

In these illustrative examples, a function may have a higher priority than others if the function is one that is desirable to have available continuously or when needed. As a result, the function with the higher priority may be given more resources in the control panel than other functions. Further, the priority of functions may change, depending on the phase of flight. For example, a cargo door control may have a higher priority when the aircraft is on the ground rather than when the aircraft is in flight.

Thereafter, a determination is made as to whether the programmable control panel selected from the list provides a function that should not be supplemented with additional functions (operation 2122). If the programmable control panel should not be changed, the process then proceeds to operation 2114 as described above. These factors may include whether the selected programmable control panel has safety-related functions, the function relies on a line of sight that may not be present, or other modifications that may reduce the current functionality of the programmable control panel to an undesired level.

If the programmable control panel should be changed, the process then modifies the programmable control panel with the functions from the failed programmable control panel (operation 2124), with the process terminating thereafter. In operation 2124, the modification may include, for example, without limitation, adding the number of functions from the failed programmable control panel as a number of second level control functions, replacing the number of control functions with those from the failed programmable control panel, or making the number of control functions from the failed programmable control panel the number of first level control functions with the current number of control functions becoming a number of second level control functions.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. Additionally, the processes may be implemented in organic components integrated with inorganic components and/or may be comprised entirely of organic components excluding a human being.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 22, an illustration of a data processing system is depicted in accordance with an illustrative embodiment. Data processing system 2200 may be used to implement one or more computers in computer system 112 in FIG. 1. In this illustrative example, data processing system 2200 includes communications framework 2202, which provides communications between processor unit 2204, memory 2206, persistent storage 2208, communications unit 2210, input/output (I/O) unit 2212, and display 2214. In this example, communications framework 2202 may take the form of a bus system.

Processor unit 2204 serves to execute instructions for software that may be loaded into memory 2206. Processor unit 2204 may be a number of processors, a multi-processor core, or some other type of processor, depending on the particular implementation.

Memory 2206 and persistent storage 2208 are examples of storage devices 2216. A storage device is any piece of hardware that is capable of storing information, such as, for example, without limitation, data, program code in functional form, and other suitable information either on a temporary basis or a permanent basis. Storage devices 2216 also may be referred to as computer readable storage devices in these illustrative examples. Memory 2206, in these examples, may be, for example, a random access memory or any other suitable volatile or non-volatile storage device. Persistent storage 2208 may take various forms, depending on the particular implementation.

For example, persistent storage 2208 may contain one or more components or devices. For example, persistent storage 2208 may be a hard drive, a flash memory, a rewritable optical disk, a rewritable magnetic tape, or some combination of the above. The media used by persistent storage 2208 also may be removable. For example, a removable hard drive may be used for persistent storage 2208.

Communications unit 2210, in these illustrative examples, provides for communications with other data processing systems or devices. In these illustrative examples, communications unit 2210 is a network interface card.

Input/output unit 2212 allows for input and output of data with other devices that may be connected to data processing system 2200. For example, input/output unit 2212 may provide a connection for user input through a keyboard, a mouse, and/or some other suitable input device. Further, input/output unit 2212 may send output to a printer. Display 2214 provides a mechanism to display information to a user.

Instructions for the operating system, applications, and/or programs may be located in storage devices 2216, which are in communication with processor unit 2204 through communications framework 2202. The processes of the different embodiments may be performed by processor unit 2204 using computer-implemented instructions, which may be located in a memory, such as memory 2206.

These instructions are referred to as program code, computer usable program code, or computer readable program code that may be read and executed by a processor in processor unit 2204. The program code in the different embodiments may be embodied on different physical or computer readable storage media, such as memory 2206 or persistent storage 2208.

Program code 2218 is located in a functional form on computer readable media 2220 that is selectively removable and may be loaded onto or transferred to data processing system 2200 for execution by processor unit 2204. Program code 2218 and computer readable media 2220 form computer program product 2222 in these illustrative examples. In one example, computer readable media 2220 may be computer readable storage media 2224 or computer readable signal media 2226.

In these illustrative examples, computer readable storage media 2224 is a physical or tangible storage device used to store program code 2218 rather than a medium that propagates or transmits program code 2218.

Alternatively, program code 2218 may be transferred to data processing system 2200 using computer readable signal media 2226. Computer readable signal media 2226 may be, for example, a propagated data signal containing program code 2218. For example, computer readable signal media 2226 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 2200 are not meant to provide physical or architectural limitations to the manner in which different embodiments may be implemented. The different illustrative embodiments may be implemented in a data processing system including components in addition to and/or in place of those illustrated for data processing system 2200. Other components shown in FIG. 22 can be varied from the illustrative examples shown. The different embodiments may be implemented using any hardware device or system capable of running program code 2218.

Illustrative embodiments of the present disclosure may be described in the context of aircraft manufacturing and service method 2300 as shown in FIG. 23 and aircraft 2400 as shown in FIG. 24. Turning first to FIG. 23, an illustration of an aircraft manufacturing and service method is depicted in accordance with an illustrative embodiment. During pre-production, aircraft manufacturing and service method 2300 may include specification and design 2302 of aircraft 2400 in FIG. 24 and material procurement 2304.

During production, component and subassembly manufacturing 2306 and system integration 2308 of aircraft 2400 in FIG. 24 takes place. Thereafter, aircraft 2400 in FIG. 24 may go through certification and delivery 2310 in order to be placed in service 2312. While in service 2312 by a customer, aircraft 2400 in FIG. 24 is scheduled for routine maintenance and service 2314, which may include modification, reconfiguration, refurbishment, and/or other maintenance or service.

Each of the processes of aircraft manufacturing and service method 2300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 24, an illustration of an aircraft is depicted in which an illustrative embodiment may be implemented. In this example, aircraft 2400 is produced by aircraft manufacturing and service method 2300 in FIG. 23 and may include airframe 2402 with plurality of systems 2404 and interior 2406. Examples of systems 2404 include one or more of propulsion system 2408, electrical system 2410, hydraulic system 2412, and environmental system 2414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2300 in FIG. 23. In one illustrative example, components or subassemblies produced in component and subassembly manufacturing 2306 in FIG. 23 may be fabricated or manufactured in a manner similar to components or subassemblies produced while aircraft 2400 is in service 2312 in FIG. 23. As yet another example, one or more apparatus embodiments, method embodiments, or a combination thereof may be utilized during production stages, such as component and subassembly manufacturing 2306 and system integration 2308 in FIG. 23.

In one illustrative example, programmable control panels may be manufactured and programmed during component and subassembly manufacturing 2306. In other illustrative examples, programmable control panels may be programmed while being installed in aircraft 2400 during system integration 2308. Programmable control panels in aircraft 2400 may be reprogrammed to include functions from programmable control panels that may not operate as desired during in service 2312.

One or more apparatus embodiments, method embodiments, or a combination thereof may be utilized while aircraft 2400 is in service 2312 and/or during maintenance and service 2314 in FIG. 23. For example, programmable control panels in aircraft 2400 may be updated, replaced, reprogrammed, or otherwise serviced during maintenance and service 2314. The use of a number of the different illustrative embodiments may substantially expedite the assembly of and/or reduce the cost of aircraft 2400.

The description of the different illustrative embodiments has been presented for purposes of illustration and description and is not intended to be exhaustive or limited to the embodiments in the form disclosed. Many modifications and variations will be apparent to those of ordinary skill in the art. For example, one or more illustrative embodiments may be applied to vehicles other than aircraft. Other vehicles may be selected from one of an aircraft, a spacecraft, a surface ship, a submarine, an automobile, a train, a truck, and other suitable types of vehicles.

Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a programmable control panel for a vehicle, the method comprising:
assigning a number of first level control functions to the programmable control panel for the vehicle; and
assigning a number of second level control functions to the programmable control panel based on a health of programmable control panels in the vehicle, such that the programmable control panel is now configured to provide the number of first level control functions and the number of second level control functions, assigning comprising:
responsive to a particular programmable control panel in the programmable control panels failing to operate as desired, identifying an associated number of first level control functions for the particular programmable control panel; and
assigning the associated number of first level control functions to the programmable control panel as the number of second level control functions to the programmable control panel.

2. The method of claim 1, wherein assigning the number of first level control functions to the programmable control panel in the vehicle comprises:
assigning the number of first level control functions to the programmable control panel in the vehicle based on a location of the programmable control panel in the vehicle.

3. The method of claim 1, wherein assigning the number of first level control functions to the programmable control panel in the vehicle comprises:
assigning the number of first level control functions to the programmable control panel in the vehicle prior to the programmable control panel being installed in the vehicle.

4. The method of claim 1, wherein assigning the number of first level control functions to the programmable control panel in the vehicle comprises:
assigning the number of first level control functions to the programmable control panel in the vehicle after the programmable control panel is installed in the vehicle.

5. The method of claim 1 further comprising:
displaying a user interface for the number of first level control functions and the number of second level control functions on a display device in the programmable control panel.

6. The method of claim 1, further comprising:
selecting the programmable control panel for assignment of the number of second level control functions based on a proximity of the programmable control panel to the particular programmable control panel.

7. The method of claim 1, wherein the programmable control panel has a user input system having at least one of a touch screen and programmable physical buttons.

8. The method of claim 1, wherein the vehicle is selected from one of an aircraft, a spacecraft, a surface ship, a submarine, an automobile, a train, and a truck.

9. An apparatus comprising:
a programmable control panel configured to be connected to a vehicle; receive a number of first level control functions to the programmable control panel for the vehicle; and receive a number of second level control functions to the programmable control panel based on a health of programmable control panels in the vehicle, such that the programmable control panel is now configured to provide the number of first level control functions and the number of second level control functions, wherein the number of second level control functions is an associated number of first level control functions for a second programmable control panel which is failing to operate as desired.

10. The apparatus of claim 9, wherein the number of first level control functions is a number of current first level control functions performed by the programmable control panel and is for controlling a system in the vehicle.

11. The apparatus of claim 9, wherein the programmable control panel comprises:
a user input system;
a display system;
a communication unit;
a storage device configured to store software for the number of first level control functions and the number of second level control functions; and
a processor unit configured to run the software.

12. The apparatus of claim 11, wherein a touch screen forms the user input system and the display system.

13. A vehicle system comprising:
a plurality of systems;
programmable control panels configured to control the plurality of systems, wherein a programmable control panel in the programmable control panels is configured to perform a number of first level control functions and the programmable control panel in the programmable control panels is configured to perform a number of second level control functions based on a health of the programmable control panels in the vehicle; and
a panel manager configured to assign the number of first level control functions to the programmable control panel and assign the number of second level control functions to the programmable control panel based on the health of the programmable control panels, wherein in being configured to assign the number of second level control functions to the programmable control panel based on the health of the programmable control panels, the panel manager is configured to identify an associated number of first level control functions for a particular programmable control panel in response to the particular programmable control panel in the programmable control panels failing to operate as desired and assign the associated number of first level control functions to the programmable control panel and the number of second level control functions to the programmable control panel.

14. The vehicle system of claim 13, wherein the panel manager is configured to assign the number of first level control functions to the programmable control panel in the vehicle based on a location of the programmable control panel in the vehicle.

15. The vehicle system of claim 13, wherein the panel manager is configured to assign the number of second level control functions to the programmable control panel based on a location of the programmable control panel relative to another the particular programmable control panel failing to operate as desired.

16. The vehicle system of claim 13 further comprising:
the vehicle, wherein the vehicle is selected from one of an aircraft, a spacecraft, a surface ship, a submarine, an automobile, a train, and a truck.

* * * * *